US012667960B2

(12) United States Patent
Gildert et al.

(10) Patent No.: US 12,667,960 B2
(45) Date of Patent: Jun. 30, 2026

(54) SYSTEMS, METHODS, AND CONTROL MODULES FOR CONTROLLING GRASPING BY ROBOT SYSTEMS

(71) Applicant: Sanctuary Cognitive Systems Corporation, Vancouver (CA)

(72) Inventors: Suzanne Gildert, Vancouver (CA); Geordie Rose, Vancouver (CA); Mani Ranjbar, Port Coquitlam (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 26 days.

(21) Appl. No.: 18/799,719

(22) Filed: Aug. 9, 2024

(65) Prior Publication Data

US 2025/0050495 A1 Feb. 13, 2025

Related U.S. Application Data

(60) Provisional application No. 63/531,632, filed on Aug. 9, 2023.

(51) Int. Cl.
| | |
|---|---|
| *B25J 9/16* | (2006.01) |
| *B25J 13/08* | (2006.01) |
| *B25J 15/00* | (2006.01) |

(52) U.S. Cl.
CPC ............. *B25J 9/1612* (2013.01); *B25J 9/161* (2013.01); *B25J 9/1661* (2013.01); *B25J 13/087* (2013.01); *B25J 15/0009* (2013.01)

(58) Field of Classification Search
CPC .... B25J 13/0087; B25J 15/0009; B25J 9/161; B25J 9/1612; B25J 9/1661
See application file for complete search history.

(56) References Cited

U.S. PATENT DOCUMENTS

| | | | |
|---|---|---|---|
| 2022/0288783 A1* | 9/2022 | Sundermeyer | G06T 7/55 |
| 2023/0330866 A1* | 10/2023 | Kasai | B25J 15/12 |

* cited by examiner

*Primary Examiner* — Wade Miles
*Assistant Examiner* — Zachary Joseph Wallace
(74) *Attorney, Agent, or Firm* — Thomas Mahon

(57) ABSTRACT

Systems, methods, and control modules for operating robot systems are described. A touch heatmap is generated for an object, indicating at least one touch region for the object. Touch regions indicate regions of an object which are most suitable or most prone to touching when the object is grasped. At least one end effector is controlled in accordance with at least one grasp primitive, to grasp the object in accordance with at least one touch region specified in the touch heatmap.

18 Claims, 13 Drawing Sheets

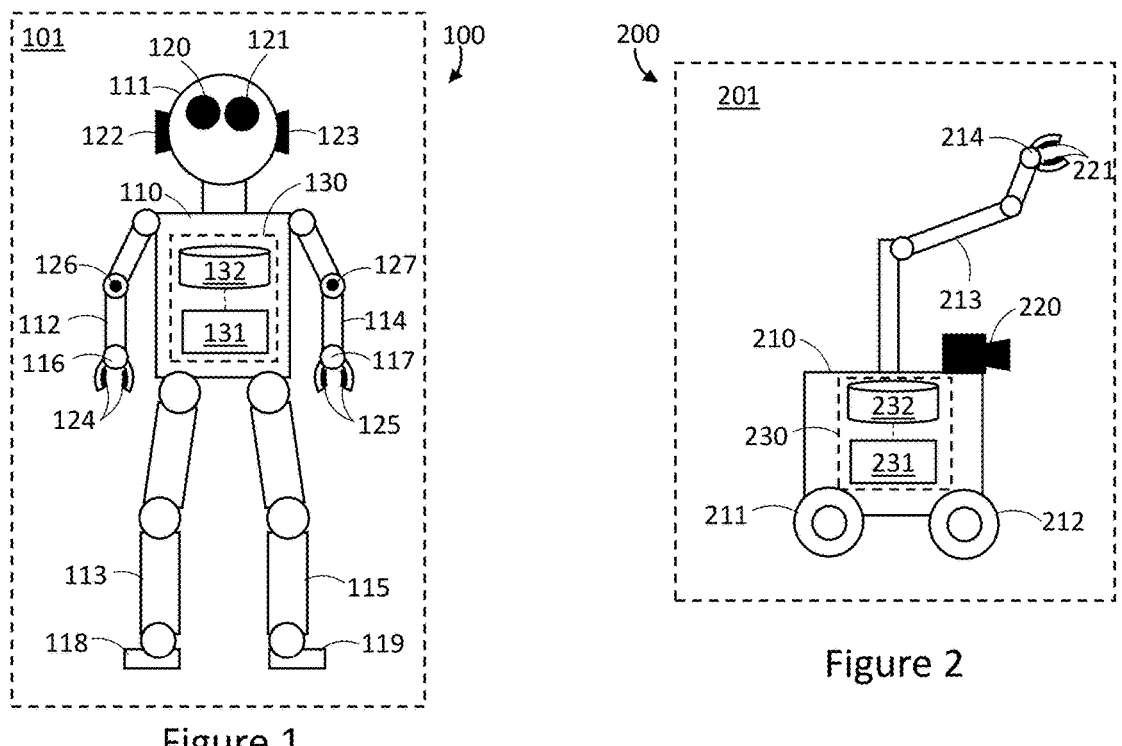
Figure 1
Figure 2
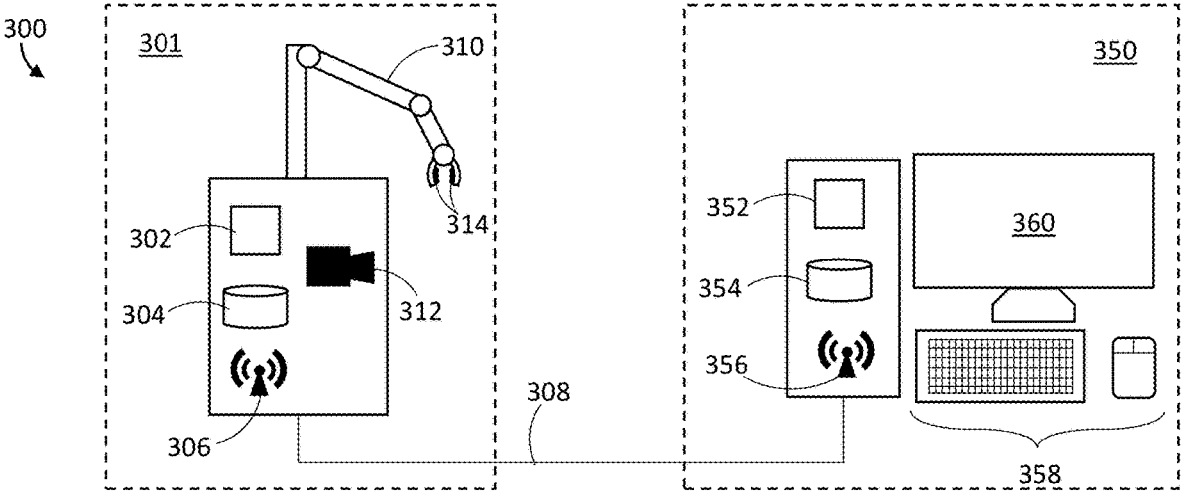
Figure 3

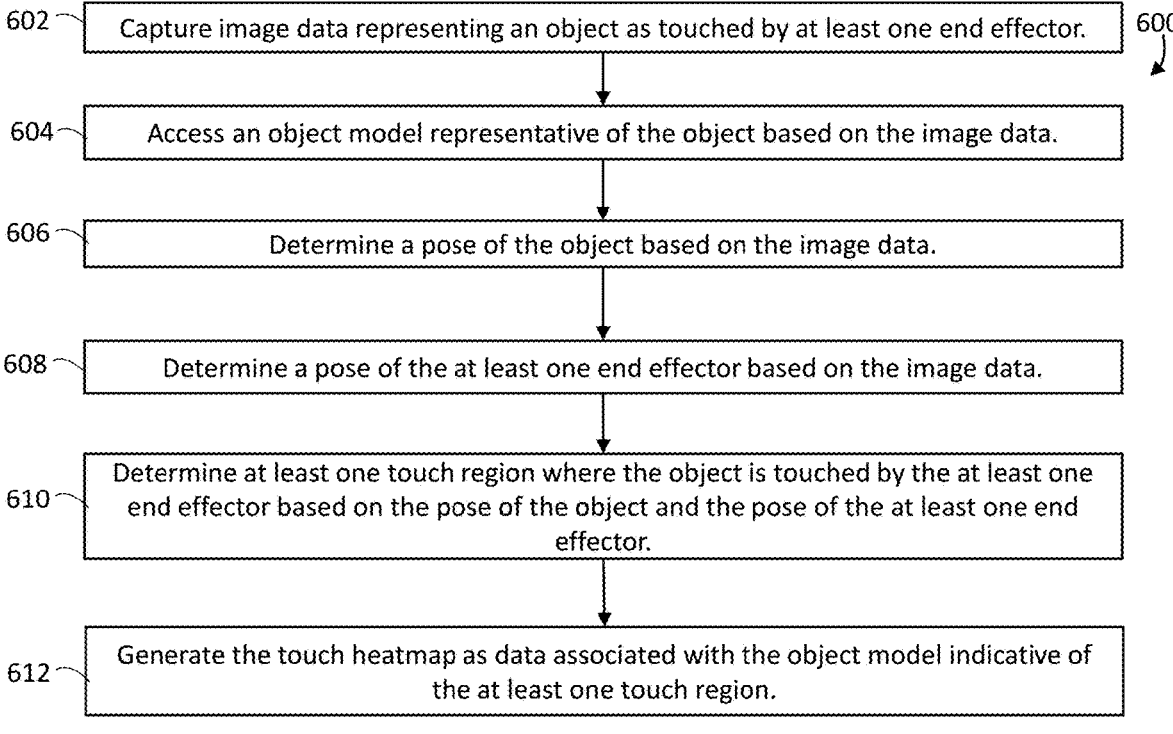

602 — Capture image data representing an object as touched by at least one end effector.    600

604 — Access an object model representative of the object based on the image data.

606 — Determine a pose of the object based on the image data.

608 — Determine a pose of the at least one end effector based on the image data.

610 — Determine at least one touch region where the object is touched by the at least one end effector based on the pose of the object and the pose of the at least one end effector.

612 — Generate the touch heatmap as data associated with the object model indicative of the at least one touch region.

Figure 6

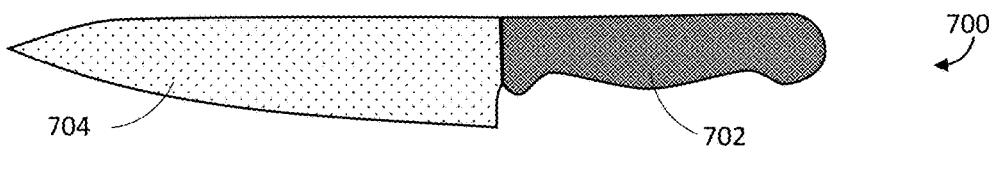

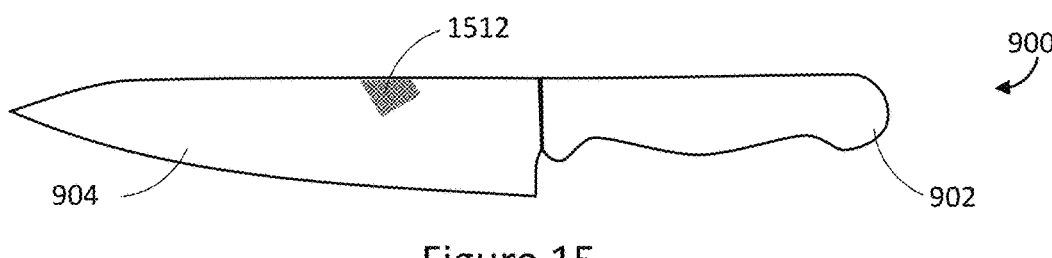
Figure 15
Figure 16
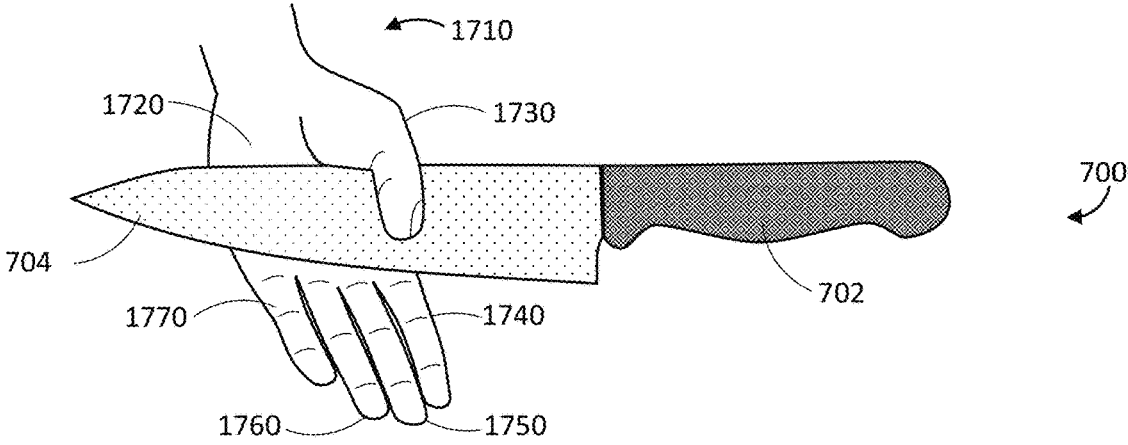
Figure 17

1800

1802 — Capture sensor data including a representation of an object.

1804 — Access an object model representative of the object based on the sensor data.

1806 — Access a touch heatmap associated with the object model, the touch heatmap indicative of at least one touch region of the object model.

1808 — Access a grasp primitive from a library of grasp primitives.

1810 — Control the at least one end effector to grasp the object based on the at least one touch region of the object model.

Figure 18

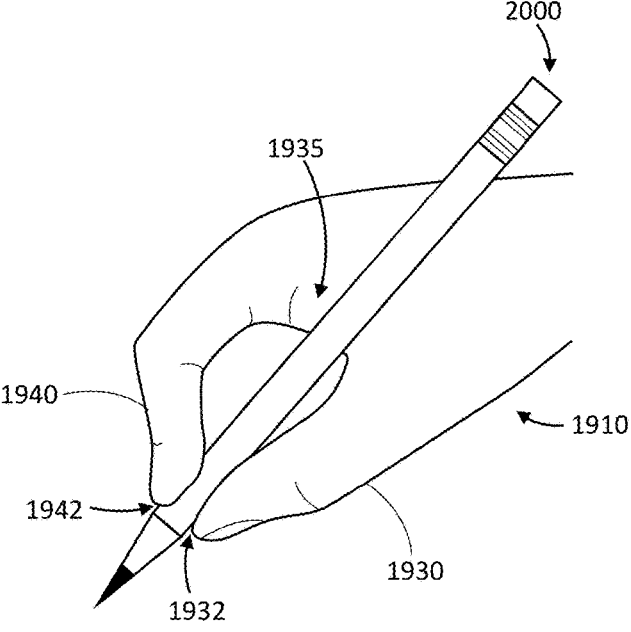

Figure 19

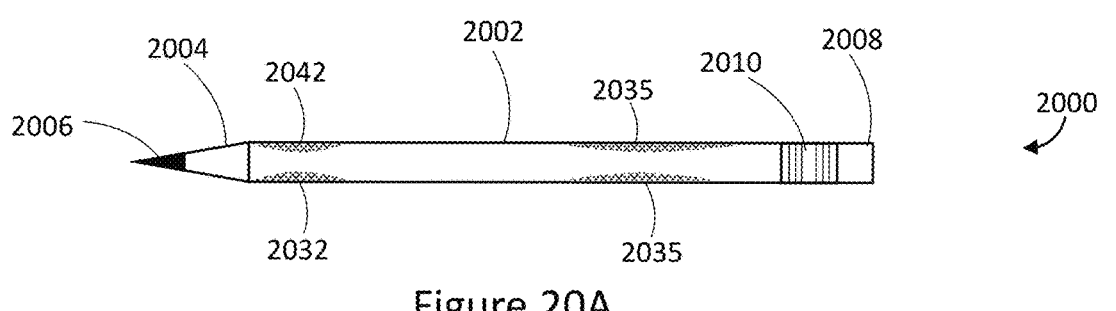
Figure 20A
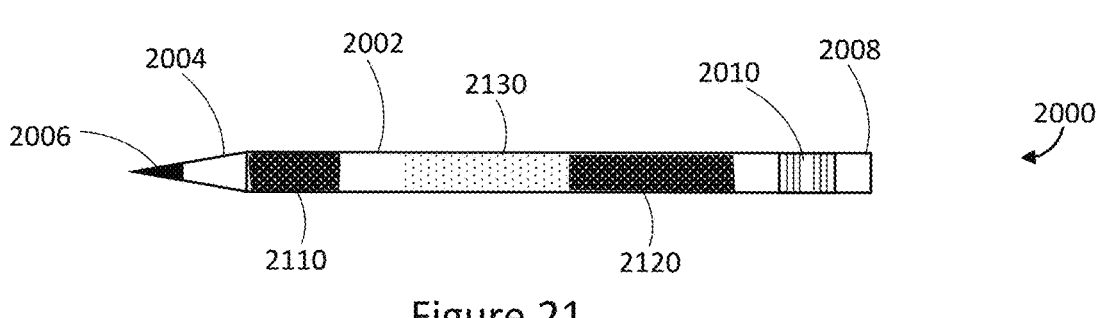
Figure 20B
Figure 21

SYSTEMS, METHODS, AND CONTROL MODULES FOR CONTROLLING GRASPING BY ROBOT SYSTEMS

TECHNICAL FIELD

The present systems, methods and control modules generally relate to controlling robot systems, and in particular relate to controlling end effectors of robot systems to grasp objects.

DESCRIPTION OF THE RELATED ART

Robots are machines that may be deployed to perform work. General purpose robots (GPRs) can be deployed in a variety of different environments, to achieve a variety of objectives or perform a variety of tasks. Robots can engage, interact with, and manipulate objects in a physical environment. It is desirable for a robot to be able to effectively grasp and engage with objects in the physical environment.

BRIEF SUMMARY

According to a broad aspect, the present disclosure describes a robot system comprising: a robot body having at least one end effector; at least one sensor; a robot controller including at least one processor and at least one non-transitory processor-readable storage medium storing processor-executable instructions which, when executed by the at least one processor, cause the robot system to: capture, by the at least one sensor, sensor data including a representation of an object; access, in a library of object models, an object model representation of the object based on the sensor data; access a touch heatmap associated with the object model, the touch heatmap indictive of at least one touch region of the object model; and control, by the robot controller, the at least one end effector to grasp the object based on the at least one touch region of the object model.

The at least one non-transitory processor-readable storage medium may further store a library of grasp primitives; the processor-executable instructions may further cause the at least one processor to access a first grasp primitive from the library of grasp primitives; and the processor-executable instructions which cause the robot controller to control the at least one end effector to grasp the object may further cause the robot controller to control the at least one end effector to grasp the object in accordance with the first grasp primitive. The touch heatmap may be further indicative of at least one grasp primitive including the first grasp primitive for grasping the object model at the at least one touch region. The processor-executable instructions may further cause the robot controller to select the first grasp primitive from the library of grasp primitives based on the touch heatmap.

The touch heatmap may be indicative of a plurality of touch regions of the object model; the processor-executable instructions may further cause the robot controller to select a subset of touch regions from the plurality of touch regions; and the processor-executable instructions which cause the robot controller to control the at least one end effector to grasp the object may cause the robot controller to control the at least one end effector to grasp the object based on the subset of touch regions. The processor-executable instructions may further cause the robot controller to access a work objective of the robot system; and the processor-executable instructions which cause the robot controller to select the subset of touch regions may cause the robot controller to select the subset of touch regions based on the work objective of the robot system. The processor-executable instructions which cause the robot controller to select the subset of touch regions may cause the robot controller to select the subset of touch regions based on proximity of the subset of touch regions at the object to the robot body or to the at least one end effector. The touch heatmap may be indicative of frequency of touch at each touch region in the plurality of touch regions; and the processor-executable instructions which cause the robot controller to select the subset of touch regions may cause the robot controller to select the subset of touch regions based on frequency of touch as indicated in the touch heatmap. The at least one non-transitory processor-readable storage medium may further store a library of grasp primitives usable by the at least one end effector; and the processor-executable instructions which cause the robot controller to select the subset of touch regions may cause the robot controller to select the subset of touch regions based on the subset of touch regions being graspable in accordance with at least one grasp primitive in the library of grasp primitives. The at least one non-transitory processor-readable storage medium may further store a library of grasp primitives usable by the at least one end effector; the processor-executable instructions may further cause the robot controller to select a first grasp primitive of the library of grasp primitives capable of grasping the object in accordance with the subset of touch regions; and the processor-executable instructions which cause the robot controller to control the at least one end effector to grasp the object based on the subset of touch regions may further cause the robot controller to grasp the object in accordance with the first grasp primitive.

The at least one end effector may include a first end effector and a second end effector; the touch heatmap may be indicative of a plurality of touch regions of the object model; the processor-executable instructions may further cause the robot controller to select a first subset of touch regions and a second subset of touch regions from the plurality of touch regions; and the processor-executable instructions which cause the robot controller to control the at least one end effector to grasp the object may cause the robot controller to control the first end effector to grasp the object in accordance with the first subset of touch regions and to control the second end effector to grasp the object in accordance with the second subset of touch regions.

The touch heatmap may be stored as metadata associated with the object model.

The robot body may carry the at least one sensor and the robot controller.

The robot system may further comprise a remote device remote from the robot body, and a communication interface which communicatively couples the remote device and the robot body, and the robot body may carry the at least one sensor; the remote device may include the robot controller; the processor-executable instructions may further cause the communication interface to transmit the sensor data from the robot body to the remote device; and the processor-executable instructions which cause the robot controller to control the at least one end effector may cause the robot controller to prepare and send control instructions to the robot body via the communication interface.

The robot system may further comprise a remote device remote from the robot body, and a communication interface which communicatively couples the remote device and the robot body; the robot body may carry the at least one sensor, a first processor of the at least one processor, and a first non-transitory processor-readable storage medium of the at least one non-transitory processor-readable storage medium;

the remote device may include a second processor of the at least one processor, and a second non-transitory processor-readable storage medium of the at least one non-transitory processor-readable storage medium; the processor-executable instructions may include first processor-executable instructions stored at the first non-transitory processor-readable storage medium that when executed cause the robot system to: capture the sensor data by the at least one sensor; transmit, via the communication interface, the sensor data from the robot body to the remote device; and control, by the first at least one processor, the at least one end effector to grasp the object; and the processor-executable instructions may include second processor-executable instructions stored at the second non-transitory processor-readable storage medium that when executed cause the robot system to: access, from the second non-transitory processor-readable storage medium, the object model representation; access, from the second non-transitory processor-readable storage medium, the touch heatmap; and transmit, via the communication interface, data indicating the object model and the at least one touch region to the robot body.

According to another broad aspect, the present disclosure describes a method for operating a robot system including a robot body, at least one sensor, and a robot controller including at least one processor and at least one non-transitory processor-readable storage medium storing a library of object models and a library of associated touch heatmaps, the method comprising: capturing, by the at least one sensor, sensor data including a representation of an object; accessing, by the robot controller in the library of object models, an object model representation of the object based on the sensor data; accessing, by the robot controller in the library of touch heatmaps, a touch heatmap associated with the object model, the touch heatmap indictive of at least one touch region of the object model; and controlling, by the robot controller, the at least one end effector to grasp the object based on the at least one touch region of the object model.

The at least one non-transitory processor-readable storage medium may further store a library of grasp primitives; the method may further comprise accessing, by the robot controller, a first grasp primitive from the library of grasp primitives; and controlling the end effector to grasp the object may further comprise controlling the at least one end effector to grasp the object in accordance with the first grasp primitive. The touch heatmap may be further indicative of at least one grasp primitive including the first grasp primitive for grasping the object model at the at least one touch region. The method may further comprise selecting, by the robot controller, the first grasp primitive from the library of grasp primitives based on the touch heatmap.

The touch heatmap may be indicative of a plurality of touch regions of the object model; the method may further comprise selecting, by the robot controller, a subset of touch regions from the plurality of touch regions; and controlling the at least one end effector to grasp the object may comprise controlling the at least one end effector to grasp the object based on the subset of touch regions. The method may further comprise accessing, by the robot controller, a work objective of the robot system; and the processor-executable instructions which cause the robot controller to select the subset of touch regions may cause the robot controller to select the subset of touch regions based on the work objective of the robot system. Selecting the subset of touch regions may comprise selecting the subset of touch regions based on proximity of the subset of touch regions at the object to the robot body or to the at least one end effector.

The touch heatmap may be indicative of frequency of touch at each touch region in the plurality of touch regions; and selecting the subset of touch regions may comprise selecting the subset of touch regions based on frequency of touch as indicated in the touch heatmap. The at least one non-transitory processor-readable storage medium may further store a library of grasp primitives usable by the at least one end effector; and selecting the subset of touch regions may comprise selecting the subset of touch regions based on the subset of touch regions being graspable in accordance with at least one grasp primitive in the library of grasp primitives. The at least one non-transitory processor-readable storage medium may further store a library of grasp primitives usable by the at least one end effector; the method may further comprise selecting, by the robot controller, a first grasp primitive of the library of grasp primitives capable of grasping the object in accordance with the subset of touch regions; and controlling the at least one end effector to grasp the object based on the subset of touch regions may comprise controlling the at least one end effector to grasp the object the object in accordance with the first grasp primitive.

The at least one end effector may include a first end effector and a second end effector; the touch heatmap may be indicative of a plurality of touch regions of the object model; the method may further comprise selecting, by the robot controller, a first subset of touch regions and a second subset of touch regions from the plurality of touch regions; and controlling the at least one end effector to grasp the object may comprise controlling the first end effector to grasp the object in accordance with the first subset of touch regions and to control the second end effector to grasp the object in accordance with the second subset of touch regions.

Accessing the touch heatmap may comprise accessing metadata associated with the object model which represents the touch heatmap.

The robot body may carry the at least one sensor and the robot controller; and capturing the sensor data, accessing the object model, accessing the touch heatmap, and controlling the at least one end effector may be performed at the robot body.

The robot system may further include a remote device remote from the robot body, and a communication interface which communicatively couples the remote device and the robot body; the robot body may carry the at least one sensor; the remote device may include the robot controller; capturing the sensor data may be performed at the robot body; the method may further comprise transmitting, by the communication interface, the sensor data from the robot body to the remote device; accessing the object model, accessing the touch heatmap, and controlling the at least one end effector may be performed at the remote device; and controlling the at least one end effector may comprise the robot controller preparing and sending control instructions to the robot body via the communication interface.

The robot system may further comprise a remote device remote from the robot body, and a communication interface which communicatively couples the remote device and the robot body; the robot body may carry the at least one sensor, a first processor of the at least one processor, and a first non-transitory processor-readable storage medium of the at least one non-transitory processor-readable storage medium; the remote device may include a second processor of the at least one processor, and a second non-transitory processor-readable storage medium of the at least one non-transitory processor-readable storage medium; capturing the sensor data and controlling the at least one end effector may be performed at the robot body; accessing the object model and accessing the touch heatmap may be performed at the remote device; the method may further comprise transmitting, by the communication interface, the sensor data from the robot body to the remote device; and the method may further comprise transmitting, by the communication interface, data indicating the object model and the at least one touch region from the remote device to the robot body.

According to yet another broad aspect, the present disclosure describes a robot control module comprising at least one non-transitory processor-readable storage medium storing a library of object models, a library of touch heatmaps associated with the library of object models, and processor-executable instructions or data that, when executed by at least one processor of a processor-based system, cause the processor-based system to: capture, by at least one sensor carried by a robot body of the processor-based system, sensor data including a representation of an object; access, in the library of object models, an object model representation of the object based on the sensor data; access, in the library of touch heatmaps, a touch heatmap associated with the object model, the touch heatmap indictive of at least one touch region of the object model; and control, by the at least one processor, the at least one end effector to grasp the object based on the at least one touch region of the object model.

The at least one non-transitory processor-readable storage medium may further store a library of grasp primitives; the processor-executable instructions or data may further cause the at least one processor to access a first grasp primitive from the library of grasp primitives; and the processor-executable instructions or data which cause the at least one processor to control the at least one end effector to grasp the object may further cause the at least one processor to control the at least one end effector to grasp the object in accordance with the first grasp primitive. The touch heatmap may be further indicative of at least one grasp primitive including the first grasp primitive for grasping the object model at the at least one touch region. The processor-executable instructions or data may further cause the at least one processor to select the first grasp primitive from the library of grasp primitives based on the touch heatmap.

The touch heatmap may be indicative of a plurality of touch regions of the object model; the processor-executable instructions or data may further cause the at least one processor to select a subset of touch regions from the plurality of touch regions; and the processor-executable instructions or data which cause the at least one processor to control the at least one end effector to grasp the object may cause the at least one processor to control the at least one end effector to grasp the object based on the subset of touch regions. The processor-executable instructions or data may further cause the at least one processor to access a work objective of the processor-based system; and the processor-executable instructions or data which cause the at least one processor to select the subset of touch regions may cause the at least one processor to select the subset of touch regions based on the work objective of the processor-based system. The processor-executable instructions or data which cause the at least one processor to select the subset of touch regions may cause the at least one processor to select the subset of touch regions based on proximity of the subset of touch regions at the object to the robot body or to the at least one end effector. The touch heatmap may be indicative of frequency of touch at each touch region in the plurality of touch regions; and the processor-executable instructions or data which cause the at least one processor to select the subset of touch regions may cause the at least one processor to select the subset of touch regions based on frequency of touch as indicated in the touch heatmap. The at least one non-transitory processor-readable storage medium may further store a library of grasp primitives usable by the at least one end effector; and the processor-executable instructions or data which cause the at least one processor to select the subset of touch regions may cause the at least one processor to select the subset of touch regions based on the subset of touch regions being graspable in accordance with at least one grasp primitive in the library of grasp primitives. The at least one non-transitory processor-readable storage medium may further store a library of grasp primitives usable by the at least one end effector; the processor-executable instructions or data may further cause the at least one processor to select a first grasp primitive of the library of grasp primitives capable of grasping the object in accordance with the subset of touch regions; and the processor-executable instructions or data which cause the at least one processor to control the at least one end effector to grasp the object based on the subset of touch regions may further cause the at least one processor to grasp the object in accordance with the first grasp primitive.

The at least one end effector may include a first end effector and a second end effector; the touch heatmap may be indicative of a plurality of touch regions of the object model; the processor-executable instructions or data may further cause the at least one processor to select a first subset of touch regions and a second subset of touch regions from the plurality of touch regions; and the processor-executable instructions or data which cause the at least one processor to control the at least one end effector to grasp the object may cause the at least one processor to control the first end effector to grasp the object in accordance with the first subset of touch regions and to control the second end effector to grasp the object in accordance with the second subset of touch regions.

The touch heatmap may be stored as metadata associated with the object model.

The robot body may carry the at least one sensor, the at least one processor, and the at least one non-transitory processor-readable storage medium; and the processor-executable instructions or data which cause the processor-based system to capture the sensor data, access the object mode, access the touch heatmap, and control the at least one end effector, may be executed at the robot body.

The robot body may carry the at least one sensor; a remote device remote from the robot body may include the at least one processor; the processor-executable instructions or data may further cause the processor-based system to transmit, by a communication interface between the robot body and the remote device, the sensor data from the robot body to the remote device; and the processor-executable instructions or data which cause the at least one processor to control the at least one end effector may cause the at least one processor to prepare and send control instructions to the robot body via the communication interface.

The robot body may carry the at least one sensor, a first processor of the at least one processor, and a first non-transitory processor-readable storage medium of the at least one non-transitory processor-readable storage medium; the remote device may include a second processor of the at least one processor, and a second non-transitory processor-readable storage medium of the at least one non-transitory processor-readable storage medium; the processor-executable instructions or data may include first processor-executable instructions or data stored at the first non-transitory processor-readable storage medium that when executed cause the robot system to: capture the sensor data by the at least one sensor; transmit, via a communication interface between the robot body and the remote device, the sensor data from the robot body to the remote device; and control, by the first at least one processor, the at least one end effector to grasp the object; and the processor-executable instructions or data may include second processor-executable instructions or data stored at the second non-transitory processor-readable storage medium that when executed cause the robot system to: access, from the second non-transitory processor-readable storage medium, the object model representation; access, from the second non-transitory processor-readable storage medium, the touch heatmap; and transmit, via the communication interface, data indicating the object model and the at least one touch region to the robot body.

According to yet another broad aspect, the present disclosure describes a method for generating a touch heatmap for an object, the method comprising: capturing, by at least one image sensor, image data representing the object as touched by at least one end effector; accessing, by at least one processor, an object model representative of the object based on the image data; determining, by the at least one processor, a pose of the object based on the image data; determining, by the at least one processor, a pose of the at least one end effector based on the image data; and determining, by the at least one processor, at least one touch region where the object is touched by the at least one end effector based on the pose of the object and the pose of the at least one end effector; and generate, by the at least one processor, the touch heatmap as data associated with the object model indicative of the at least one touch region.

The method may further comprise associating at least one grasp primitive with the touch heatmap, each grasp primitive of the at least one grasp primitive associated with a respective subset of touch regions of the at least one touch region and based on a grasp configuration of the at least one end effector.

The image data representing the object as touched by at least one end effector may comprise image data representing the object as touched by at least one end effector of a robot body. The image data representing the object as touched by at least one end effector may comprise image data representing the object as touched by at least one human hand.

The image data may include a plurality of images; the plurality of images may represent the object as touched by the at least one end effector at a plurality of touch regions; determining a pose of the object based on the image data may comprise determining a pose of the object for each image in the image data; determining a pose of the at least one end effector based on the image data may comprise determining a pose of the at least one end effector for each image in the image data; determining at least one touch region where the object is touched by the at least one end effector may comprise determining the plurality of touch regions based on the pose of the object and the pose of the at least one end effector for each image in the image data; and generating the touch heatmap may comprise generating the touch heatmap as data associated with the object model indicative of the plurality of grasp locations. The method may further comprise determining a frequency of touch by the at least one end effector for each touch region, based on quantity of times each touch region is touched in the plurality of images.

BRIEF DESCRIPTION OF THE SEVERAL VIEWS OF THE DRAWINGS

The various elements and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

FIGS. 1, 2, and 3 are respective illustrative diagrams of exemplary robot systems comprising various features and components described throughout the present systems, methods, and control modules.

FIG. 6 is a flowchart diagram of an exemplary method for generating a touch heatmap, in accordance with at least one illustrated example.

FIG. 7 is a side view of a knife object.

FIGS. 13, 14, and 15 are side views of an object model and touch regions of the knife for the examples shown in FIGS. 10, 11, and 12.

FIG. 16 is a side view of an object model and touch heatmap for the knife shown in FIGS. 7, 8A, 8B, 10, 11, and 12, in accordance with at least one illustrated example.

FIG. 17 is a side view of the knife of FIG. 7, being grasped by a human hand, in accordance with at least one illustrated example.

FIG. 18 is a flowchart diagram of an exemplary method for controlling a robot to grasp an object, in accordance with at least one illustrated example.

FIG. 19 is a side view of a pencil being grasped by a human hand.

FIGS. 20A and 20B are opposing side views of the pencil shown in FIG. 19.

FIG. 21 is a side view of an object model and touch heatmap for the pencil shown in FIGS. 19, 20A, and 20B.

DETAILED DESCRIPTION

Figures 4A, 4B, 4C:
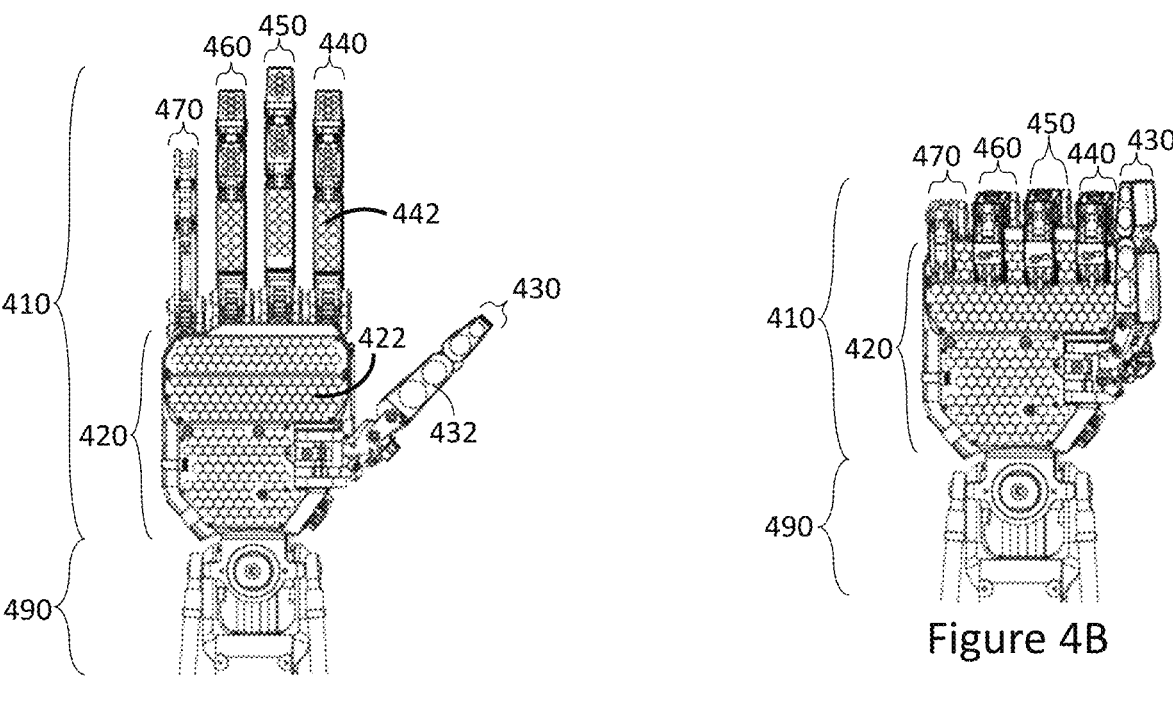
FIGS. 4A, 4B, and 4C are respective views of a hand-shaped member having tactile or haptic sensors thereon.

The following description sets forth specific details in order to illustrate and provide an understanding of the various implementations and embodiments of the present systems, methods, and control modules. A person of skill in the art will appreciate that some of the specific details described herein may be omitted or modified in alternative implementations and embodiments, and that the various implementations and embodiments described herein may be combined with each other and/or with other methods, components, materials, etc. in order to produce further implementations and embodiments.

In some instances, well-known structures and/or processes associated with computer systems and data processing have not been shown or provided in detail in order to avoid unnecessarily complicating or obscuring the descriptions of the implementations and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment" include "embodiments" and "the embodiments," respectively, and reference to "an implementation" and "the implementation" include "implementations" and "the implementations," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present systems, methods, and control modules.

FIG. 1 is a front view of an exemplary robot system 100 in accordance with one implementation. In the illustrated example, robot system 100 includes a robot body 101 that is designed to approximate human anatomy, including a torso 110 coupled to a plurality of components including head 111, right arm 112, right leg 113, left arm 114, left leg 115, right end-effector 116, left end-effector 117, right foot 118, and left foot 119, which approximate anatomical features. More or fewer anatomical features could be included as appropriate for a given application. Further, how closely a robot approximates human anatomy can also be selected as appropriate for a given application.

Each of components 110, 111, 112, 113, 114, 115, 116, 117, 118, and 119 can be actuatable relative to other components. Any of these components which is actuatable relative to other components can be called an actuatable member. Actuators, motors, or other movement devices can couple together actuatable components. Driving said actuators, motors, or other movement driving mechanism causes actuation of the actuatable components. For example, rigid limbs in a humanoid robot can be coupled by motorized joints, where actuation of the rigid limbs is achieved by driving movement in the motorized joints.

End effectors 116 and 117 are shown in FIG. 1 as grippers, but any end effector could be used as appropriate for a given application. FIGS. 4A, 4B, and 4C discussed later illustrate an exemplary case where the end effectors can be hand-shaped members. In some implementations, the end effectors and/or hands described herein, including but not limited to end effectors 116 and/or 117, may incorporate any or all of the teachings described in U.S. patent application Ser. No. 17/491,577, U.S. patent application Ser. No. 17/749,536, U.S. Provisional Patent Application Ser. No. 63/323,897, and/or U.S. Provisional Patent Application Ser. No. 63/342, 414, each of which is incorporated herein by reference in its entirety.

Right leg 113 and right foot 118 can together be considered as a support member and/or a locomotion member, in that the leg 113 and foot 118 together can support robot body 101 in place, or can move in order to move robot body 101 in an environment (i.e. cause robot body 101 to engage in locomotion). Left leg 115 and left foot 119 can similarly be considered as a support member and/or a locomotion member. Legs 113 and 115, and feet 118 and 119 are exemplary support and/or locomotion members, and could be substituted with any support members or locomotion members as appropriate for a given application. For example, FIG. 2 discussed later illustrates wheels as exemplary locomotion members instead of legs and feet.

Robot system 100 in FIG. 1 includes a robot body 101 that closely approximates human anatomy, such that input to or control of robot system 100 can be provided by an operator performing an action, to be replicated by the robot body 101 (e.g. via a tele-operation suit or equipment). In some implementations, it is possible to even more closely approximate human anatomy, such as by inclusion of actuatable components in a face on the head 111 of robot body 101, or with more detailed design of hands or feet of robot body 101, as non-limiting examples. However, in other implementations a complete approximation of the human anatomy is not required, and a robot body may only approximate a portion of human anatomy. As non-limiting examples, only an arm of human anatomy, only a head or face of human anatomy; or only a leg of human anatomy could be approximated.

Robot system 100 is also shown as including sensors 120, 121, 122, 123, 124, 125, 126, and 127 which collect context data representing an environment of robot body 101. In the example, sensors 120 and 121 are image sensors (e.g. cameras) that capture visual data representing an environment of robot body 101. Although two image sensors 120 and 121 are illustrated, more or fewer image sensors could be included. Also in the example, sensors 122 and 123 are audio sensors (e.g. microphones) that capture audio data representing an environment of robot body 101. Although two audio sensors 122 and 123 are illustrated, more or fewer audio sensors could be included. In the example, haptic (tactile) sensors 124 are included on end effector 116, and haptic (tactile) sensors 125 are included on end effector 117. Haptic sensors 124 and 125 can capture haptic data (or tactile data) when objects in an environment are touched or grasped by end effectors 116 or 117. Haptic or tactile sensors could also be included on other areas or surfaces of robot body 101. Also in the example, proprioceptive sensor 126 is included in arm 112, and proprioceptive sensor 127 is included in arm 114. Proprioceptive sensors can capture proprioceptive data, which can include the position(s) of one or more actuatable member(s) and/or force-related aspects of touch, such as force-feedback, resilience, or weight of an element, as could be measured by a torque or force sensor (acting as a proprioceptive sensor) of an actuatable member which causes touching of the element. "Proprioceptive" aspects of touch which can also be measured by a proprioceptive sensor can also include kinesthesia, motion, rotation, or inertial effects experienced when a member of a robot touches an element, as can be measured by sensors such as an Inertial measurement unit (IMU), and accelerometer, a gyroscope, or any other appropriate sensor (acting as a proprioceptive sensor). Generally, robot system 100 (or any other robot system discussed herein) can also includes sensors such an actuator sensor which captures actuator data indicating a state of a corresponding actuator, an inertial sensor which captures inertial data, or a position encoder which captures position data about at least one joint or appendage.

Several types of sensors are illustrated in the example of FIG. 1, though more or fewer sensor types could be included. For example, audio sensors may not be included. As another example, other sensor types, such as accelerometers, inertial sensors, gyroscopes, temperature sensors, humidity sensors, pressure sensor, radiation sensors, or any other appropriate types of sensors could be included. Further, although sensors 120 and 121 are shown as approximating human eyes, and sensors 122 and 123 are shown as approximating human ears, sensors 120, 121, 122, and 123 could be positioned in any appropriate locations and have any appropriate shape.

Throughout this disclosure, reference is made to "haptic" sensors, "haptic" feedback, and "haptic" data. Herein, "haptic" is intended to encompass all forms of touch, physical contact, or feedback. This can include (and be limited to, if appropriate) "tactile" concepts, such as texture or feel as can be measured by a tactile sensor. Unless context dictates otherwise, "haptic" can also encompass "proprioceptive" aspects of touch.

Robot system 100 is also illustrated as including at least one processor 131, communicatively coupled to at least one non-transitory processor-readable storage medium 132. The at least one processor 131 can control actuation of components 110, 111, 112, 113, 114, 115, 116, 117, 118, and 119; can receive and process data from sensors 120, 121, 122, 123, 124, 125, 126, and 127; can determine context of the robot body 101, and can determine transformation trajectories, among other possibilities. The at least one non-transitory processor-readable storage medium 132 can have processor-executable instructions or data stored thereon, which when executed by the at least one processor 131 can cause robot system 100 to perform any of the methods discussed herein. Further, the at least one non-transitory processor-readable storage medium 132 can store sensor data, classifiers, reusable work primitives, grasp primitives, object models, touch heatmaps, or any other data as appropriate for a given application. The at least one processor 131 and the at least one processor-readable storage medium 132 together can be considered as components of a "robot controller" 130, in that they control operation of robot system 100 in some capacity. While the at least one processor 131 and the at least one processor-readable storage medium 132 can perform all of the respective functions described in this paragraph, this is not necessarily the case, and the "robot controller" 130 can be or further include components that are remote from robot body 101. In particular, certain functions can be performed by at least one processor or at least one non-transitory processor-readable storage medium remote from robot body 101, as discussed later with reference to FIG. 3.

In some implementations, it is possible for a robot body to not approximate human anatomy. FIG. 2 is an elevated side view of a robot system 200 including a robot body 201 which does not approximate human anatomy. Robot body 201 includes a base 210, having actuatable components 211, 212, 213, and 214 coupled thereto. In the example, actuatable components 211 and 212 are wheels (locomotion members) which support robot body 201, and provide movement or locomotion capabilities to the robot body 201. Actuatable components 213 and 214 are a support arm and an end effector, respectively. The description for end effectors 116 and 117 in FIG. 1 is applicable to end effector 214 in FIG. 2. End effector 214 can also take other forms, such as a hand-shaped member as discussed later with reference to FIGS. 4A, 4B, and 4C. In other examples, other actuatable components could be included.

Robot system 200 also includes sensor 220, which is illustrated as an image sensor. Robot system 200 also includes a haptic sensor 221 positioned on end effector 214. The description pertaining to sensors 120, 121, 122, 123, 124, 125, 126, and 127 in FIG. 1 is also applicable to sensors 220 and 221 in FIG. 2 (and is applicable to inclusion of sensors in robot bodies in general). End effector 214 can be used to touch, grasp, or manipulate objects in an environment. Further, any number of end effectors could be included in robot system 200 as appropriate for a given application or implementation.

Robot system 200 is also illustrated as including a local or on-board robot controller 230 comprising at least one processor 231 communicatively coupled to at least one non-transitory processor-readable storage medium 232. The at least one processor 231 can control actuation of components 210, 211, 212, 213, and 214; can receive and process data from sensors 220 and 221; and can determine context of the robot body 201 and can determine transformation trajectories, among other possibilities. The at least one non-transitory processor-readable storage medium 232 can store processor-executable instructions or data that, when executed by the at least one processor 231, can cause robot body 201 to perform any of the methods discussed herein. Further, the at least one processor-readable storage medium 232 can store sensor data, classifiers, reusable work primitives, grasp primitives, object models, touch heatmaps, or any other data as appropriate for a given application.

FIG. 3 is a schematic diagram illustrating components of a robot system 300 comprising a robot body 301 and a physically separate remote device 350 in accordance with the present robots and methods.

Robot body 301 is shown as including at least one local or on-board processor 302, a non-transitory processor-readable storage medium 304 communicatively coupled to the at least one processor 302, a wireless communication interface 306, a wired communication interface 308, at least one actuatable component 310, at least one sensor 312, and at least one haptic sensor 314. However, certain components could be omitted or substituted, or elements could be added, as appropriate for a given application. As an example, in many implementations only one communication interface is needed, so robot body 301 may include only one of wireless communication interface 306 or wired communication interface 308. Further, any appropriate structure of at least one actuatable portion could be implemented as the actuatable component 310 (such as those shown in FIGS. 1 and 2, for example). For example, robot body 101 as described with reference to FIG. 1, or robot body 201 described with reference to FIG. 2, could be used in place of robot body 301, and communication interface 306 or communication interface 308 could be implemented therein to enable communication with remote device 350. Further still, the at least one sensor 312 and the at least one haptic sensor 314 can include any appropriate quantity or type of sensor, as discussed with reference to FIGS. 1 and 2.

Remote device 350 is shown as including at least one processor 352, at least one non-transitory processor-readable medium 354, a wireless communication interface 356, a wired communication interface 308, at least one input device 358, and an output device 360. However, certain components could be omitted or substituted, or elements could be added, as appropriate for a given application. As an example, in many implementations only one communication interface is needed, so remote device 350 may include only one of wireless communication interface 356 or wired communication interface 308. As another example, input device 358 can receive input from an operator of remote device 350, and output device 360 can provide information to the operator, but these components are not essential in all implementations. For example, remote device 350 can be a server which communicates with robot body 301, but does not require operator interaction to function. Additionally, output device 360 is illustrated as a display, but other output devices are possible, such as speakers, as a non-limiting example. Similarly, the at least one input device 358 is illustrated as a keyboard and mouse, but other input devices are possible.

In some implementations, the at least one processor 302 and the at least one processor-readable storage medium 304 together can be considered as a "robot controller", which controls operation of robot body 301. In other implementations, the at least one processor 352 and the at least one processor-readable storage medium 354 together can be considered as a "robot controller" which controls operation of robot body 301 remotely. In yet other implementations, that at least one processor 302, the at least one processor 352, the at least one non-transitory processor-readable storage medium 304, and the at least one processor-readable storage medium 354 together can be considered as a "robot controller" (distributed across multiple devices) which controls operation of robot body 301. "Controls operation of robot body 301" refers to the robot controller's ability to provide instructions or data for operation of the robot body 301 to the robot body 301. In some implementations, such instructions could be explicit instructions which control specific actions of the robot body 301. In other implementations, such instructions or data could include broader instructions or data which guide the robot body 301 generally, where specific actions of the robot body 301 are controlled by a control unit of the robot body 301 (e.g. the at least one processor 302), which converts the broad instructions or data to specific action instructions. In some implementations, a single remote device 350 may communicatively link to and at least partially control multiple (i.e., more than one) robot bodies. That is, a single remote device 350 may serve as (at least a portion of) the respective robot controller for multiple physically separate robot bodies 301.

FIGS. 4A, 4B, and 4C illustrate an exemplary end effector 410 coupled to a member 490 of a robot body. Member 490 could be, for example, an arm of robot body 101, 201, or 301 in FIG. 1, 2, or 3. As a specific example, member 490 could correspond to arm 112 or arm 114 in robot body 101 in FIG. 1. In the illustrated example, end effector 410 is hand-shaped, to grasp, grip, handle, manipulate, touch, or release objects similar to how a human hand would. In the illustrated example, end effector 410 includes finger-shaped members 430, 440, 450, 460, and 470. Although five finger-shaped members are illustrated, any number of finger-shaped members could be included as appropriate for a given application. Finger-shaped member 430 can alternatively be referred to as a thumb-shaped member. Each of finger-shaped members 430, 440, 450, 460, and 470 are coupled to a palm-shaped member 420. Palm-shaped member 420 serves as a common member to which the finger-shaped members are coupled. In the example, each of finger-shaped members 430, 440, 450, 460, and 470 are actuatable relative to the palm-shaped member 420 at a respective joint. The finger-shaped members can also include joints at which sub-members of a given finger-shaped member are actuatable. A finger-shaped member can include any number of sub-members and joints, as appropriate for a given application.

End effector 410 in FIGS. 4A, 4B, and 4C can be referred to as a "hand-shaped member". Similar language is used throughout this disclosure, and is sometimes abbreviated to simply "hand" for convenience.

In some implementations, the end effectors and/or hands described herein, including but not limited to hand 410, may incorporate any or all of the teachings described in U.S. patent application Ser. No. 17/491,577, U.S. patent application Ser. No. 17/749,536, U.S. Provisional Patent Application Ser. No. 63/323,897, and/or U.S. Provisional Patent Application Ser. No. 63/342,414, each of which is incorporated herein by reference in its entirety.

Although joints are not explicitly labelled in FIGS. 4A, 4B, and 4C to avoid clutter, the location of such joints can be understood based on the different configurations of end-effector 410 shown in FIGS. 4A, 4B, and 4C. FIG. 4A is a front-view which illustrates end effector 410 in an open configuration, with finger-shaped members 430, 440, 450, 460, and 470 extended from palm-shaped member 420 (for example to receive or touch an object). FIG. 4B is a front view which illustrates end effector 410 in a closed configuration, with finger-shaped members 430, 440, 450, 460, and 470 closed into palm-shaped member 420 (for example to grasp or grip an object). FIG. 4C is an isometric view which illustrates end effector 410 in the closed configuration as in FIG. 4B. The closed configuration of FIGS. 4B and 4C can also be called a contracted configuration, in that finger-shaped members 430, 440, 450, 460, and 470 are "contracted" inward relative to each other. The closed configuration can also be referred to as a grasp configuration, used for grasping an object. Notably, FIGS. 4B and 4C illustrate one particular grasp configuration, but hand 410 is capable of many different grasp configurations, as appropriate to grasp a given object. Additional grasp configurations can entail different variations of position, applied force, and orientation of any of finger-shaped members 430, 440, 450, 460, and 470. Further, a given grasp configuration need not involve grasping an object with all of finger-shaped members 430, 440, 450, 460, and 470; some grasp configurations may use only a limited subset of finger-shaped members to grasp an object. Several exemplary, non-limiting, grasp configurations are shown in FIGS. 8A, 8B, 10, 11, 12, 22, and 26.

Additionally, FIGS. 4A, 4B, and 4C illustrate a plurality of tactile sensors 422, 432, and 442 on respective palm-shaped member 420 and finger-shaped members 430 and 440. Similar tactile sensors are optionally included on finger-shaped members 450 and 460 which are not labelled to avoid clutter. Finger-shaped member 470 is illustrated without tactile sensors thereon, which is indicative that in some implementations a hand-shaped member may be only partially covered by tactile sensors (although full cover by tactile sensors is possible in other implementations). Such tactile sensors can collect tactile data. Further, these "tactile" sensors can also be referred to as "haptic" sensors, in that they collect data relating to touch, which is included in haptic data as discussed earlier.

In some implementations, the present systems, methods, and control modules utilize a library of object models, where object models in the library of object models represent particular objects. This is discussed below with reference to FIGS. 5A and 5B.

Figure 5A:
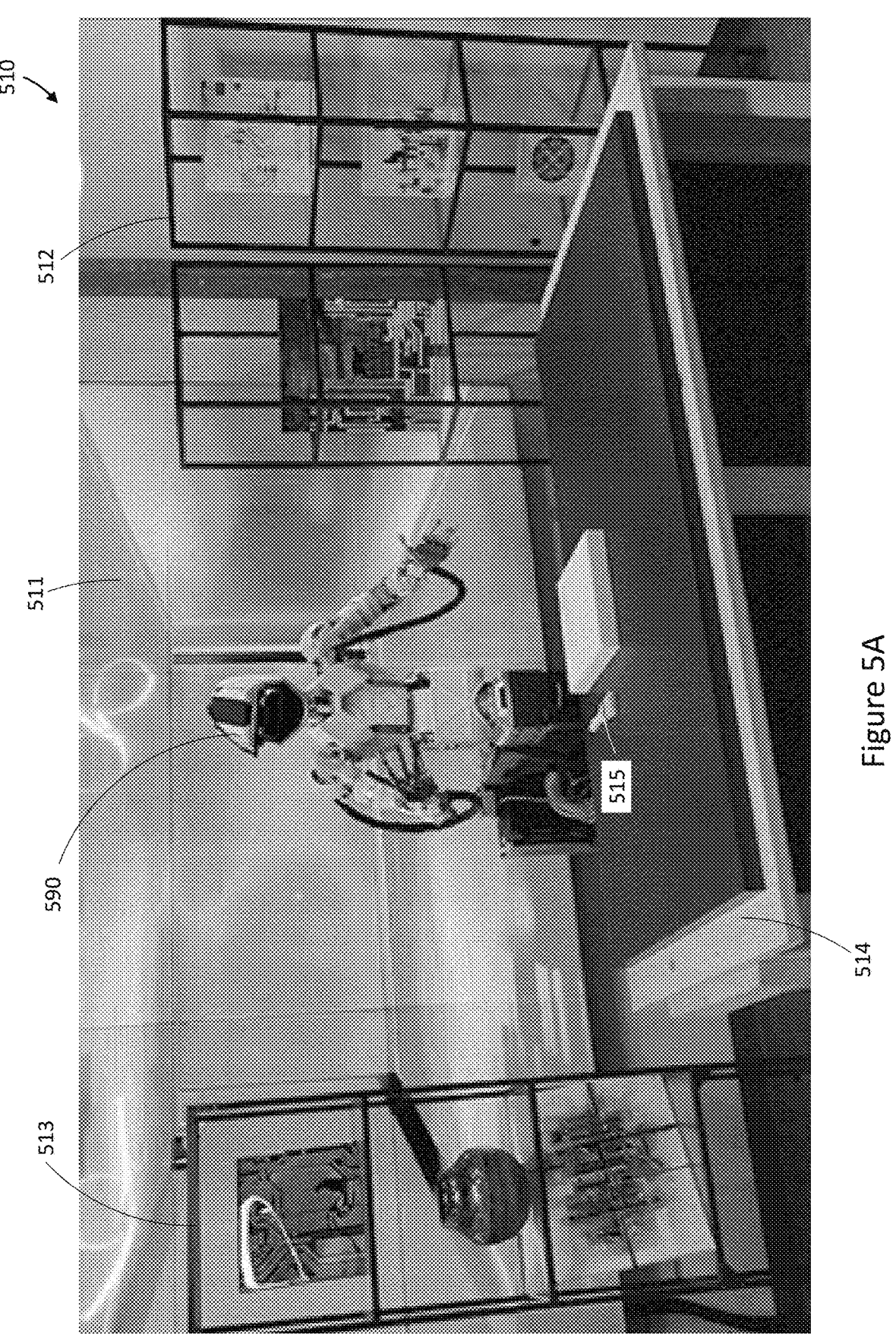
FIG. 5A is a scene view of an exemplary environment.

FIG. 5A is a scene view which illustrates an exemplary environment 510 in which a robot body 590 is positioned. Environment 510 includes at least display 511 behind robot body 590, shelving units 512 and 513 to the sides of robot body 590, a table 514 in front of robot body 590, and a brush 515 on table 514. The foregoing does not describe every feature or element illustrated in environment 510, but rather describes some prominent features to provide insight into what is shown in FIG. 5A.

Figure 5B:
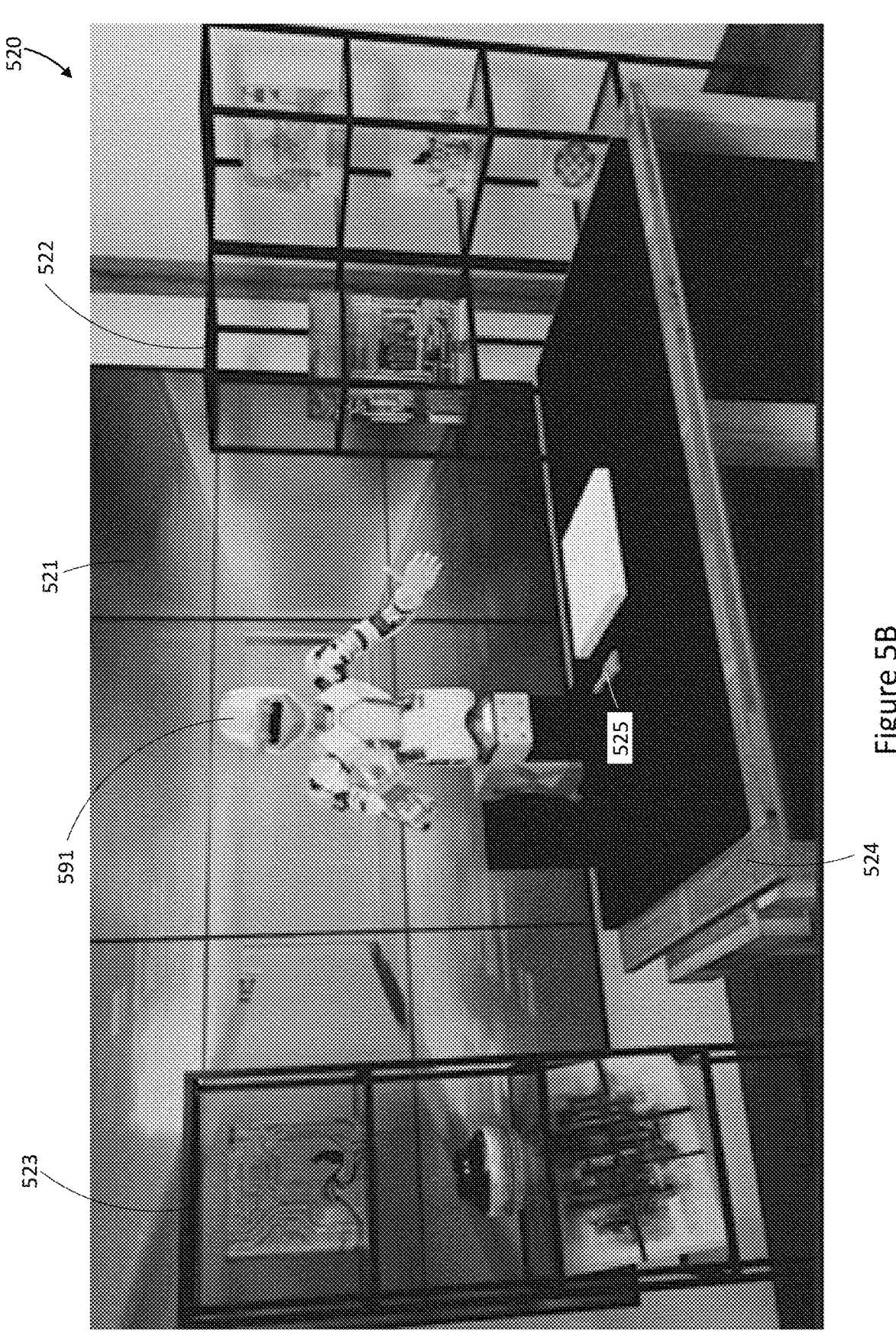
FIG. 5B is a scene view of a virtual environment model which represents the environment shown in FIG. 5A.

FIG. 5B is a scene view which illustrates a virtual environment model 520 which represents environment 510 in FIG. 5A. Environment model 520 includes representation 591, which is a virtual model of robot 590 in FIG. 5A. Environment model 520 includes representation 521 of display 511 behind representation 591 of robot body 590, representations 522 and 523 of shelving units 512 and 513 to the sides of representation 591 of robot body 590, representation 524 of table 514 in front of representation 591 of robot body 590, and representation 525 of brush 515 on representation 524 of table 514. Environment model 520 can include a visually rendered representation 591 of robot body 590, such that when robot body 590 is operated at least partially based on environment model 520, robot body 590 can be "seen" as representation 591 in environment model 520. Alternatively, environment model 520 can specify representation 591 as a spatial representation of robot body 590 (even if not visually rendered) where elements in the environment model 520 are specified relative to a position of representation 591 of robot body 590. In this way representation 591 of robot body 590 may not be visually "seen" as representation 591, but locations of elements relative to the position of representation 591 can still be understood.

FIGS. 5A and 5B visually illustrate an environment model representing an environment, and such an environment model can be constructed, generated, populated, and/or refined based on collected data. In some implementations, environment 510 in FIG. 5A is a physical (real-world) environment comprising physical objects. In such implementations, data can be collected by physical systems or devices (e.g. by at least one image sensor of robot body 590, or by at least one image sensor of another device or robot), and used for construction or population of environment model 520 in FIG. 5B. In other implementations, environment 510 in FIG. 5A is a virtual environment comprising virtual objects. In such implementations, data can be virtually "collected" by simulated systems or devices (e.g. by at least one virtual image sensor of a virtual robot body 590, or by at least one virtual image sensor of another virtual device or virtual robot), and used for construction or population of environment model 520 in FIG. 5B. Generating or populating an environment model of a virtual environment is useful for example in training and/or deploying an artificial intelligence. An environment model is useful for a robot body (virtual or real) to navigate and operate within an environment which the environment model represents.

As mentioned above, the objects in environment 510 are represented by corresponding representations in environment model 520. Such representations can be object models stored in a library of object models, which are accessed to populate virtual environment 520. For example, object models in the library of object models can be three-dimensional models or meshes which at least approximately correspond in dimension, shape, appearance, texture, or any other parameters to objects or types of object which said models represent.

Each object model in the library of object models can be associated with a touch heatmap. Generally throughout this disclosure, a "touch heatmap" is data indicative of at least one touch region of an associated object model. As one example, a touch heatmap can comprise metadata stored with an object model, which indicates one or more touch regions of the object model. Touch heatmaps can be a three-dimensional overlay or mesh which overlays a three-dimensional object model, and indicates at least one touch region of the object model. Generally, the term "touch region" refers to a region of an object model which is subject to at least a modicum of touching during generation of the touch heatmap, as discussed below with reference to FIG. 6.

FIG. 6 is a flowchart diagram showing an exemplary method 600 for generating a touch heatmap. Method 600 could be performed by a robot system such as those illustrated in FIGS. 1, 2, and 3, which includes a robot body having at least one end effector, at least one sensor, and a robot controller including at least one processor and at least one non-transitory processor-readable storage medium. In other implementations, method 600 can be performed by a system comprising at least one image sensor, at least one processor, and at least one non-transitory processor-readable storage medium. Robotic end effectors, humanoid construction, many types of sensors, and other features described with reference to FIGS. 1, 2, and 3 are not necessarily required to perform method 600. The at least one non-transitory processor-readable storage medium can store data and/or processor-executable instructions that, when executed by the at least one processor, cause the system to perform the method 600. Certain acts of method 600 may be performed by at least one processor or processing unit (hereafter "processor") positioned at a robot body, and communicatively coupled to a non-transitory processor-readable storage medium positioned at the robot body (such as those illustrated in FIGS. 1, 2, and 3). The robot body may communicate, via communications and networking hardware communicatively coupled to the robot body's at least one processor, with remote systems and/or remote non-transitory processor-readable storage media, as discussed above with reference to FIG. 3. Thus, unless the specific context requires otherwise, references to a processor, non-transitory processor-readable storage medium, as well as data and/or processor-executable instructions stored in a non-transitory processor-readable storage medium, are not intended to be limiting as to the physical location of the processor or non-transitory processor-readable storage medium. Further, a method of operation of a system such as method 600 (or any of the other methods discussed herein) can be implemented as a control module or computer program product. Such a control module or computer program product is data-based, and comprises processor-executable instructions or data that, when stored on a non-transitory processor-readable storage medium of a system, and the control module or computer program product is executed by at least one processor of the system, the control module or computer program product (or the processor-executable instructions or data thereof) cause the system to perform acts of the method.

Method 600 as illustrated includes acts 602, 604, 606, 608, 610, and 612, though those of skill in the art will appreciate that in alternative implementations certain acts may be omitted and/or additional acts may be added. Those of skill in the art will also appreciate that the illustrated order of the acts is shown for exemplary purposes only and may change in alternative implementations. Method 600 is discussed below with reference to an example illustrated in FIGS. 7, 8A, 8B, 9A, and 9B. However, method 600 is applicable to any number of appropriate objects.

At 602, at least one image sensor captures image data representing an object as touched by at least one end effector. FIG. 7 is a side view of an exemplary object in this regard. In particular, FIG. 7 illustrates a knife 700 (the object), having a handle 702 and a blade 704. In this example, a library of object models includes an object model representing knife 700 (e.g. a three-dimensional representation of knife 700). FIG. 7 illustrates knife 700 alone (not being touched by an end effector) so that the features of knife 700 can be better understood.

Figure 8A:
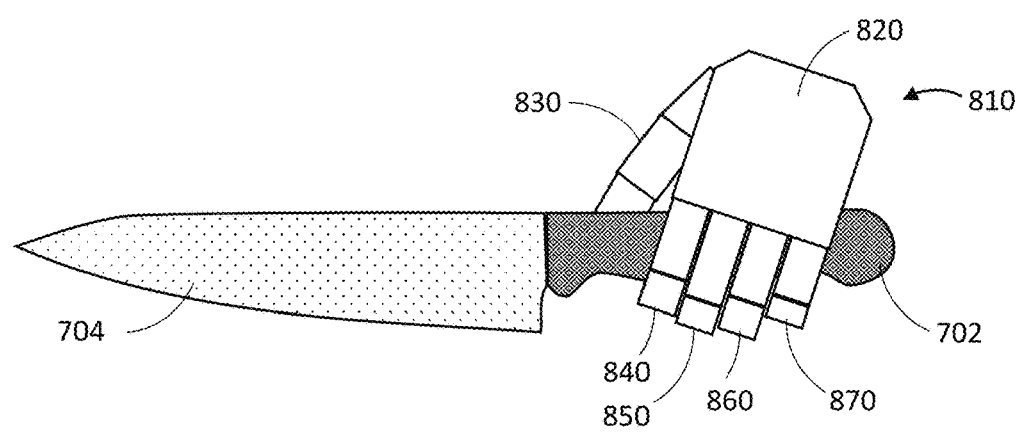
FIGS. 8A and 8B are opposing side views of the knife of FIG. 7 being grasped by an end effector, in accordance with at least one illustrated example.
Figure 8B:
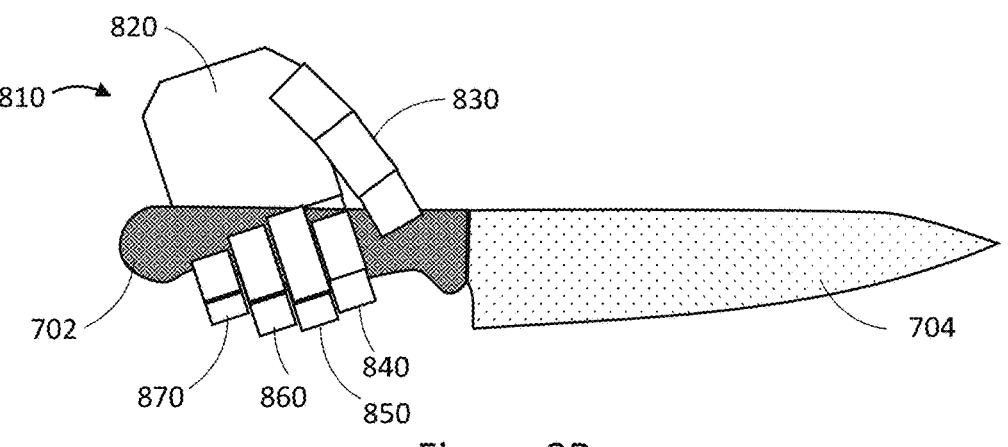

FIG. 8A is a side view of knife 700, touched by an end effector 810. FIG. 8B is an opposite side view of knife 700 touched by end effector 810. That is, FIG. 8A illustrates knife 700 touched by end effector 810 from a first perspective, and FIG. 8B illustrates knife 700 touched by end effector 810 from a second perspective opposite the first perspective.

In the example of FIGS. 8A and 8B, end effector 810 is an end effector of a robot body, and includes a palm-shaped member 820 and finger-shaped members 830, 840, 850, 860, and 870 extending from palm-shaped member 820. Finger-shaped member 830 can alternatively be referred to as a thumb-shaped member. In the example finger-shaped member 830 is positioned behind handle 702 with reference to the perspective of FIG. 8A, or in front of handle 702 with reference to the perspective of FIG. 8B, and finger-shaped members 840, 850, 860, and 870 wrap around handle 702, such that end effector 810 grasps knife 700 by handle 702.

In the context of act 602 of method 600 and the example of FIGS. 8A and 8B, image data is captured of knife 700 touched by end effector 810, such as from the perspective of FIG. 8A, the perspective of FIG. 8B, or any other appropriate perspective. The captured image data can be a single image from one perspective, or could be a plurality of images from a plurality of perspectives. In some implementations, the image data can be captured as video data comprising a plurality of images. For example, the object can be grasped and manipulated in view of a video capture device (e.g. a video camera), such that the video capture device captures a plurality of images of the object as grasped, from multiple perspectives. Further, the way the object is grasped (a grasp configuration or grasp primitive used by the end effector) can also be changed in view of the video capture device, such that the video capture device captures a plurality of images of the object as grasped in different ways. Further still, it is not necessary for video data to be continuous; in some implementations multiple sets of images may be captured as separate streams of video data. Such separate streams of video data could represent grasping of the object by different end effectors, from different perspectives, and/or performing different tasks or work objectives, as non-limiting examples.

At 604 in method 600, an object model is accessed representative of the object based on the image data. In the example of FIGS. 8A and 8B, the object (knife 700) is identified (e.g. by an image processing classification model), and a corresponding object model for knife 700 (or a generic model which at least approximates knife 700) is accessed (e.g. retrieved from a library of object models stored on a non-transitory processor-readable storage medium of a system performing method 600).

At 606, a pose of the object is determined based on the image data captured at 602. For example, features of the object can be identified by a feature identifier or classification model, and relative position, scale, orientation, or other features of the object can be analyzed to determine a pose (position, orientation, configuration, or other attributes) of the object. In the example of FIGS. 8A and 8B, relative position, orientation, and scale of the handle 702 and blade 704 (and/or features thereof) can be used to determine a pose of knife 700.

At 608, a pose of the at least one end effector is determined based on the image data. For example, features of the at least one end effector can be identified by a feature identifier or classification model, and relative position, scale, orientation, or other features of the object can be analyzed to determine a pose (position, orientation, configuration, or other attributes) of the object. In the example of FIGS. 8A and 8B, relative position, orientation, scale, and configuration of the end effector 810 (and/or features thereof) can be used to determine a pose of end effector 810.

Optionally, additional data can be accessed and used which is indicative of a pose of the at least one end effector. For example, where the at least one end effector is a robotic end effector, data such as movement, acceleration, orientation, proprioceptive, or any other types of data can be accessed which is indicative of a pose, movement, orientation, or other attributes of the at least one end effector. This is not strictly necessary however, as in some implementations the end effector (or robot body which includes the end effector) does not provide such data (e.g. the at least one end effector can include a non-robotic end effector, such as a human hand).

At 610, at least one touch region is determined (e.g. by at least one processor of the system which perform method 600). The at least one touch region comprises at least one region where the object is touched by the at least one end effector. The at least one touch region is determined based on the pose of the object as determined at 606 and the pose of the at least one end effector as determined at 608. For example, with reference to FIGS. 8A and 8B, the at least one touch region can be determined as regions where end effector 810 and knife 700 occupy common (or near-common) space (i.e. boundaries between the end effector 810 and knife 700). As another example, the at least one touch region can be determined as being regions where the knife 700 and the end effector 810 are within a distance threshold of each other, even if common space is not occupied by both knife 700 and end effector 810. In this way, errors or inaccuracies in determination of pose of the object at 606 and determined of pose of the end effector at 608 can be accounted for.

Figure 9A:
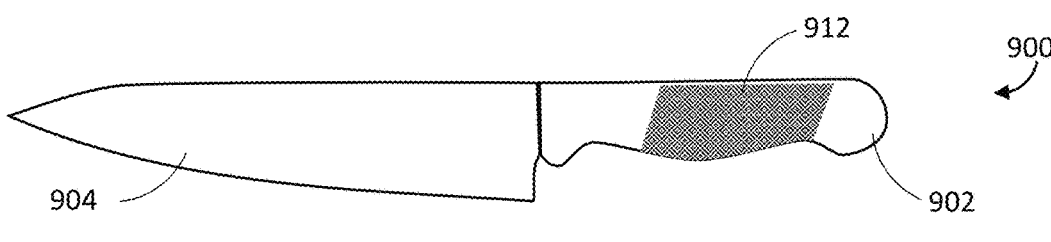
FIGS. 9A and 9B are opposing side views of an object model and touch regions of the knife shown in FIGS. 8A and 8B.
Figure 9B:
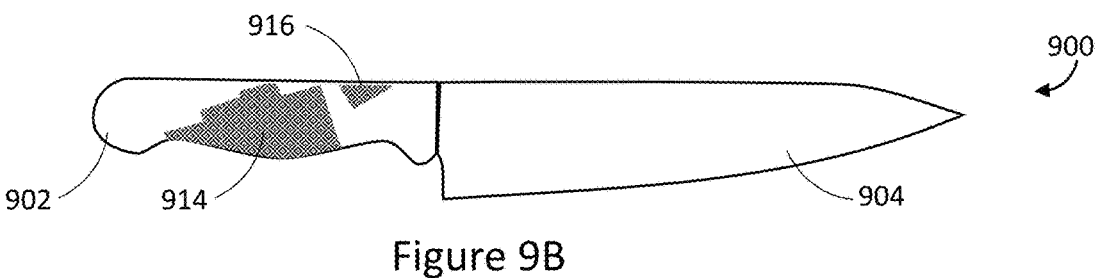

At 612, a touch heatmap is generated as data associated with object model indicative of the at least one touch region. For example, the touch heatmap can be generated as metadata which is stored together with the object model, in the library of object models. As mentioned earlier, the touch heatmap can comprise a mesh or overlay which indicates touch regions on the object model, corresponding to regions which are touched on the object in the captured image data. In this regard, FIG. 9A is a side view of object model 900 which represents knife 700, from the same perspective as shown in FIGS. 7 and 8A. Object model 900 includes handle representation 902 which represents handle 702, and blade representation 904 which represents blade 704. FIG. 9A also shows touch region 912 on handle representation 902, corresponding to where end effector 810 touches handle 702 as shown in FIG. 8A. FIG. 9B is a side view of the object model 900 which represents knife 700, from the same perspective as shown in FIG. 8B (i.e. the opposite perspective from FIG. 9A). FIG. 9B also shows touch regions 914 and 916 on handle representation 902, corresponding to where end effector 810 touches handle 702 as shown in FIG. 8B. Because finger-shaped members 940, 850, 860, and 870 wrap around handle 702, touch regions 912 and 914 could be one continuous touch region (but they are not necessarily, if touch between handle 702 and finger-shaped members 840, 850, 860, and 870 is not continuous).

The example of FIGS. 8A, 8B, 9A, and 9B is one example of one scenario where an end effector touches an object. However, an object can commonly be touched in many appropriate ways, which can also contribute to generation of a touch heatmap as discussed below with reference to FIGS. 10, 11, 12, 13, 14, 15, 16, and 17.

Figure 10:
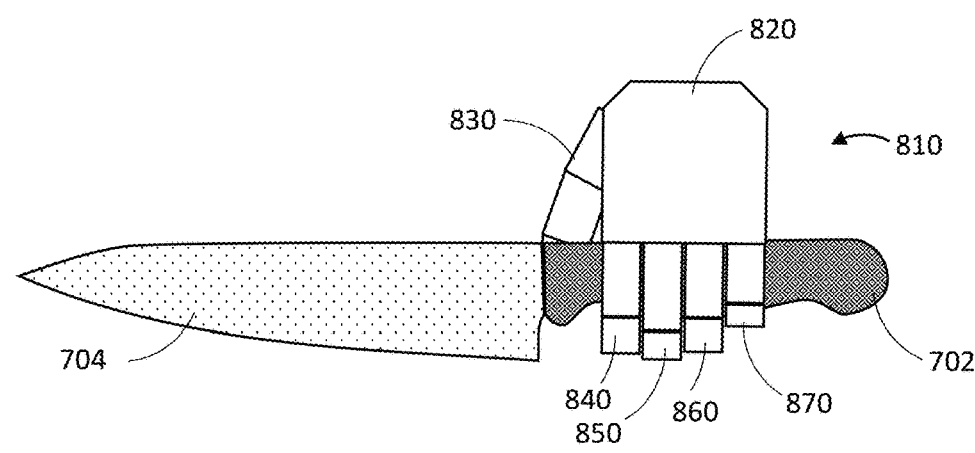
FIGS. 10, 11, and 12 are side views of the knife of FIG. 7 being grasped by an end effector, in accordance with at least three illustrated examples.
Figure 11:
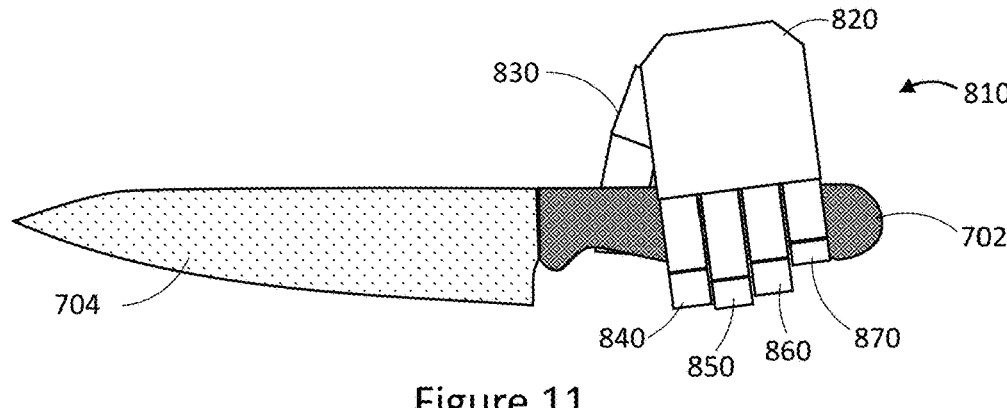
Figure 12:
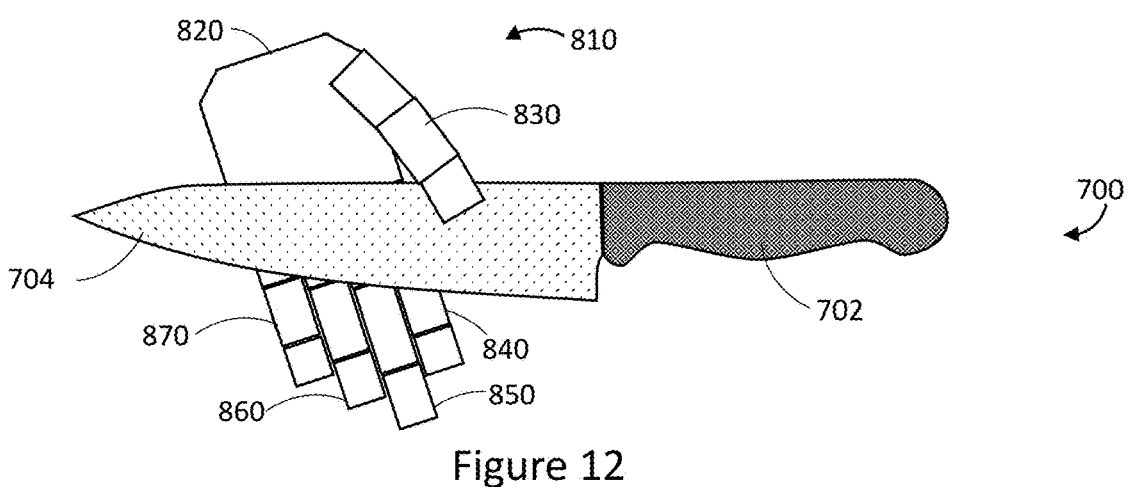

With reference to method 600 in FIG. 6, an exemplary implementation is discussed, where at 602 image data is captured as discussed earlier. In this exemplary implementation, the image data which is captured includes a plurality of images. The plurality of images represent the object as touched by the at least one end effector at a plurality of touch regions. An example of this is shown in FIGS. 10, 11, and 12, which are each side views of an object (knife 700 as described with reference to FIG. 7), as grasped by an end effector 810 similar to as described with reference to FIGS. 8A and 8B. In each of FIGS. 10, 11, and 12 (and compared to FIGS. 8A and 8B), the end effector 810 touches knife 700 at a different region or in a different way. In this regard, each of FIGS. 8A, 8B, 10, 11, and 12 illustrate respective images which can be included in the image data. FIGS. 8A and 8B show end effector 810 touching handle 702 of knife 700 at a first touch region; FIG. 10 shows end effector 810 touching handle 702 of knife 700 at a second touch region; FIG. 11 shows end effector 810 touching handle 702 of knife 700 at a third touch region; and FIG. 12 shows end effector 810 touching blade 704 of knife 700 at a fourth touch region. In some implementations, the image data can further include a plurality of images representing the object as grasped at a particular touch region from multiple perspectives (similar to as shown in FIGS. 8A and 8B), but this is not necessarily the case. As mentioned earlier, capturing of any of the plurality of images herein can be performed by capturing video data.

In the exemplary implementation, at 604, an object model representative of the object is accessed based on the image data, similar to as discussed earlier, and not repeated for brevity.

In the exemplary implementation, at 606, determining a pose of the object based on the image data comprises determining a pose of the object for each image in the image data (each image in the plurality of images). Similarly, at 608, determining a pose of the at least one end effector based on the image data comprises determining a pose of the at least one end effector for each image in the image data (each image in the plurality of images). Determination of pose of the object and pose of the at least one end effector for a given image can be performed similar to as discussed earlier, and not repeated for brevity.

In the exemplary implementation, at 608, determining at least one touch region where the object is touched by the at least one end effector comprises determining the plurality of touch regions based on the pose of the object and the pose of the at least one end effector for each image in the image data. That is, for each image in the image data, pose of the object and pose of the at least one end effector can be analyzed as discussed earlier, to determine where the at least one end effector and the object touch.

In the exemplary implementation, at 610, generating the touch heatmap comprises generating the touch heatmap as data associated with the object model indicative of the plurality of grasp locations. That is, compared to 610 as discussed earlier, in this exemplary implementation the touch heatmap is generated which includes the plurality of grasp locations. Such a heatmap is discussed below with reference to FIGS. 13, 14, 15, and 16.

Figure 13:
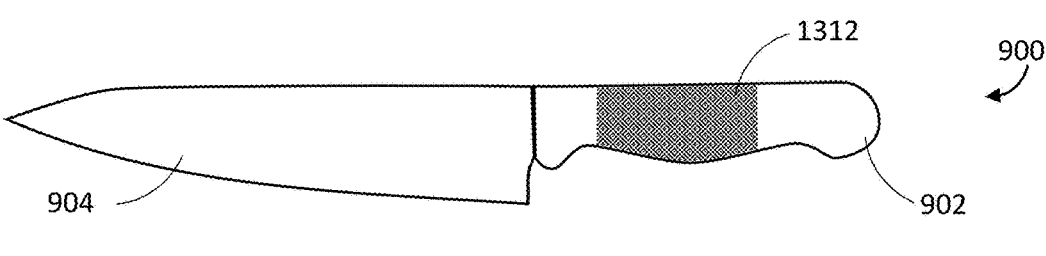
Figure 14:
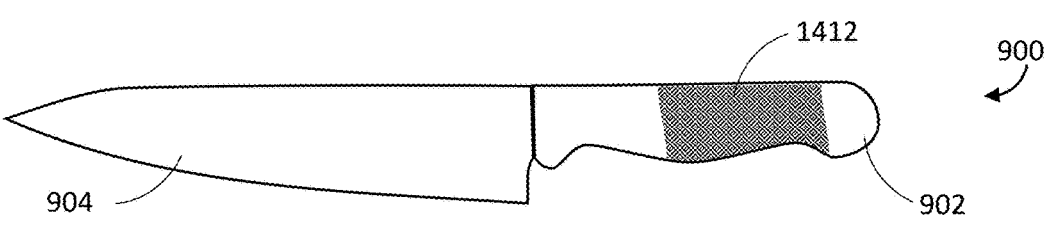

FIGS. 13, 14, and 15 are side views of object model 900 which represent knife 700, from the same perspective as shown in FIGS. 7, 8A, 10, 11, and 12. Object model 900 includes handle representation 902 which represents handle 702, and blade representation 904 which represents blade 704. FIG. 13 also shows touch region 1312 on handle representation 902, corresponding to where end effector 810 touches handle 702 as shown in FIG. 10. FIG. 14 also shows touch region 1412 on handle representation 902, corresponding to where end effector 810 touches handle 702 as shown in FIG. 11. FIG. 15 also shows touch region 1512 on blade representation 904, corresponding to where end effector 810 touches blade 704 as shown in FIG. 12.

FIG. 16 is a side view of object model 900 which represents knife 700, from the same perspective as shown in FIGS. 7, 8A, 10, 11, and 12. Object model 900 includes handle representation 902 which represents handle 702, and blade representation 904 which represents blade 704, similarly to as discussed earlier. FIG. 16 illustrates a touch heatmap which includes the touch regions shown in FIGS. 9A, 13, 14, and 15, and can also include touch regions not visible in the Figure (such as touch regions 914 and 916 in FIG. 9B). By virtue of representing a plurality of overlapping touch regions, FIG. 16 also illustrates frequency of touch at certain regions by darkness of shading: darker shading represents more frequent touch. In particular, FIG. 16 shows region 1602, where each of touch regions 912, 1312, and 1412 (three touch regions) overlap. FIG. 16 also shows region 1604 where touch regions 912 and 1312 (two touch regions) overlap. FIG. 16 also shows region 1606 where touch regions 912 and 1412 (two touch regions) overlap. FIG. 16 also shows region 1608, where only one touch region 1312 covers. FIG. 16 also shows region 1610, where only one touch region 1412 covers. FIG. 16 also shows region 1612, where only one touch region 1512 covers. In generating such a heatmap, frequency of touch by the at least one end effector can be determined for each touch region, based on quantity of times each touch region is touched in the plurality of images. For example, overlap between touch regions can be identified and summed, to produced a unified grasp heatmap showing regions of relatively high and relatively low touch frequency.

The number of touch regions and the particular overlapping shown in FIGS. 9A, 9B, 13, 14, 15, and 16 is illustrative, and more or fewer touch regions (resulting from more or fewer images in the image data representing more or fewer touch regions) can be included as appropriate for a given application.

FIG. 17 is a side view of an object (knife 700 as described with reference to FIG. 7), as grasped by an end effector 1710 similar to as described with reference to FIG. 12. One difference between FIG. 17 and FIG. 12 is that in FIG. 17, end effector 1710 is a human hand, having palm 1720, thumb 1730, and fingers 1740, 1750, 1760, and 1770. Method 600 or similar methods can still be used when the at least one end effector includes a human hand. Further, in methods where image data includes a plurality of images, the plurality of images can include images where the at least one end effector is a robotic end effector, and images where the at least one end effector is a human hand.

In accordance with the present robots, computer program products, and methods, touching and grasping may have relevance to work objectives or workflows. In this regard, a work objective, action, task or other procedure can be deconstructed or broken down into a "workflow" comprising a set of "work primitives", where successful completion of the work objective involves performing each work primitive in the workflow. Depending on the specific implementation, completion of a work objective may be achieved by (i.e., a workflow may comprise): i) performing a corresponding set of work primitives sequentially or in series; ii) performing a corresponding set of work primitives in parallel; or iii) performing a corresponding set of work primitives in any combination of in series and in parallel (e.g., sequentially with overlap) as suits the work objective and/or the robot performing the work objective. Thus, in some implementations work primitives may be construed as lower-level activities, steps, or sub-tasks that are performed or executed as a workflow in order to complete a higher-level work objective.

Advantageously, and in accordance with the present robots, computer program products, and methods, a catalog of "reusable" work primitives may be defined. A work primitive is reusable if it may be generically invoked, performed, employed, or applied in the completion of multiple different work objectives. For example, a reusable work primitive is one that is common to the respective workflows of multiple different work objectives. In some implementations, a reusable work primitive may include at least one variable that is defined upon or prior to invocation of the work primitive. For example, "pick up *object*" may be a reusable work primitive where the process of "picking up" may be generically performed at least semi-autonomously in furtherance of multiple different work objectives and the *object* to be picked up may be defined based on the specific work objective being pursued.

A subset of work primitives includes "grasp primitives". Grasp primitives are generally work primitives which are pertinent to causing an end effector to grasp one or more objects. That is, a grasp primitive can comprise instructions or data which when executed, cause an end effector to carry out a grasp action specified by the grasp primitive. Grasp primitives can be reusable, as discussed for work primitives.

Work primitives are discussed in greater detail in, at least, U.S. patent application Ser. No. 17/566,589 and U.S. patent application Ser. No. 17/883,737, both of which are incorporated by reference herein in their entirety.

Objects can have many different shapes and sizes, and the way an object is grasped generally depends on the particularities of the object. To this end, a library of grasp primitives can include different grasp primitives appropriate for grasping different sizes and shapes of objects. In the context of the present disclosure, touch heatmaps can be indicative of at least one grasp primitive for grasping an object (or object model) at appropriate touch regions. That is, in some implementations, at least one grasp primitive can be associated with a touch heatmap. In particular, each grasp primitive of the at least one grasp primitive can be associated with a respective subset of touch regions of the at least one touch region. Further, each grasp primitive of the at least one grasp primitive can be based on a grasp configuration of the at least one end effector.

With reference to the examples of FIGS. 8A, 9A, 10, 11, 13, 14, end effector 810 is in a closed configuration where finger-shaped members 830, 840, 850, 860, and 870 wrap around handle 702. In this regard, a grasp primitive associated with such a closed configuration (e.g. an instruction or data set which can be executed to cause an end effector to transform to the closed configuration) can be associated with a touch region or plurality of touch regions of handle 702 (or handle representation 902 of object model 900). In this way, when accessing touch regions for a handle of a knife, associated grasp primitives suitable for grasping such a handle are also accessed (or associated with accessed data).

With reference to the example of FIGS. 12 and 15, end effector 810 is in a relatively open pinch configuration, where blade 704 is pinched between thumb-shaped member 830 and palm-shaped member 820 (and to some extent finger-shaped members 840, 850, 860, and 870). In this regard, a grasp primitive associated with such a pinch configuration (e.g. an instruction or data set which can be executed to cause an end effector to transform to the pinch configuration) can be associated with a touch region or plurality of touch regions of blade 704 (or blade representation 904 of object model 900). In this way, when accessing touch regions for a blade of a knife, associated grasp primitives suitable for grasping such a blade are also accessed (or associated with accessed data).

In view of the above examples, it is evident that associating at least one grasp primitive with the touch heatmap advantageously provides access to data indicating not only appropriate regions for touch or grasping an object, but also appropriate ways to touch or grasp the object.

FIG. 18 is a flowchart diagram showing an exemplary method 1800 for operating a robot system. Method 1800 pertains to operation of a robot system such as those illustrated in FIGS. 1, 2, and 3, which includes a robot body having at least one end effector, at least one sensor, and a robot controller including at least one processor and at least one non-transitory processor-readable storage medium. The at least one non-transitory processor-readable storage medium can store data and/or processor-executable instructions that, when executed by the at least one processor, cause the system to perform the method. Certain acts of the method of operation of a robot system may be performed by at least one processor or processing unit (hereafter "processor") positioned at the robot body, and communicatively coupled to a non-transitory processor-readable storage medium positioned at the robot body (such as those illustrated in FIGS. 1, 2, and 3). The robot body may communicate, via communications and networking hardware communicatively coupled to the robot body's at least one processor, with remote systems and/or remote non-transitory processor-readable storage media, as discussed above with reference to FIG. 3. Thus, unless the specific context requires otherwise, references to a robot system's processor, non-transitory processor-readable storage medium, as well as data and/or processor-executable instructions stored in a non-transitory processor-readable storage medium, are not intended to be limiting as to the physical location of the processor or non-transitory processor-readable storage medium in relation to the robot body and the rest of the robot hardware. In other words, a robot system's processor or non-transitory processor-readable storage medium may include processors or non-transitory processor-readable storage media located on-board the robot body and/or non-transitory processor-readable storage media located remotely from the robot body, unless the specific context requires otherwise. Further, a method of operation of a system such as method 1800 (or any of the other methods discussed herein) can be implemented as a robot control module or computer program product. Such a robot control module or computer program product is data-based, and comprises processor-executable instructions or data that, when the robot control module or computer program product is stored on a non-transitory processor-readable storage medium of the system, and the robot control module or computer program product is executed by at least one processor of the system, the robot control module or computer program product (or the processor-executable instructions or data thereof) cause the system to perform acts of the method.

Method 1800 as illustrated includes acts 1802, 1804, 1806, 1808, and 1810 though those of skill in the art will appreciate that in alternative implementations certain acts may be omitted and/or additional acts may be added. For example, act 1808 is shown in dashed lines to indicate optionality of this act. Those of skill in the art will also appreciate that the illustrated order of the acts is shown for exemplary purposes only and may change in alternative implementations. Method 1800 is discussed below with reference to an exemplary implementation which uses image data of an object as shown in FIG. 7, and an object model and touch heatmap as shown in FIG. 16. The illustrative example uses previously discussed Figures in another context to avoid unnecessary duplication of Figures.

At 1802, at least one sensor captures sensor data including a representation of an object. For example, at least one image sensor can capture image data including a visual representation of the object. As another example, at least one tactile sensor can capture tactile data including a tactile representation of the object. Other types of sensors and data (such as those described with reference to FIGS. 1, 2, and 3) are also possible. In an illustrative example, the at least one sensor includes an image sensor, which captures image data including a representation of knife 700 as shown in FIG. 7.

At 1804, an object model is accessed from a library of object models. The accessed object model is representative of the object based on the sensor data. In the illustrative example, the object (knife 700) in FIG. 7 is identified (e.g. by an image processing classification model), and a corresponding object model for knife 700 (or a generic model which at least approximates knife 700) is accessed (e.g. retrieved from a library of object models stored on a non-transitory processor-readable storage medium of a system performing method 1800). In the illustrative example, said object model is object model 900 as shown in FIG. 16.

At 1806, a touch heatmap associated with the accessed object model is accessed (e.g. retrieved from a non-transitory processor-readable storage medium of a system performing method 1800). The touch heatmap could be stored with the object model as metadata, for example. The touch heatmap is indicative of at least one touch region of the object model. In the illustrative implementation, the touch heatmap can indicate touch regions 1602, 1604, 1606, 1608, 1610, 1612, and any other appropriate touch regions, as shown in FIG. 16. Further, the touch heatmap can be further indicative of frequency of touch at each touch region in the plurality of touch regions, as discussed earlier with reference to FIG. 16.

Act 1808 is an optional act, which is discussed in detail later.

Act 1810, the robot controller controls the at least one end effector to grasp the object based on the at least one touch region of the object. Several exemplary implementations are discussed below.

In one exemplary implementation, the at least one non-transitory processor-readable storage medium of the system performing method 1800 stores a library of grasp primitives. In accordance with 1808 of method 1800, a first grasp primitive from the library of grasp primitives is accessed. At 1810, controlling the at least one end effector to grasp the object further comprises controlling the at least one end effector to grasp the object in accordance with the first grasp primitive. By controlling the at least one end effector in accordance with a grasp primitive, operation of the at least one end effector is streamlined.

In order to access an appropriate grasp primitive, selection of grasp primitive can be performed. In some implementations, the touch heatmap accessed at 1806 in method 1800 is further indicative of at least one grasp primitive for grasping the object model at the at least one touch region. That is, the touch heatmap can be indicative of not only regions suitable for touching of the object, but ways for grasping the object suitably at said regions. The indicated at least one grasp primitive can include the first grasp primitive mentioned above, and the robot controller selects the first grasp primitive as indicated prior to controlling the at least one end effector to grasp the object. In other implementations, the first grasp primitive may not be indicated in the touch heatmap, and the robot controller itself may select the first grasp primitive from the library of grasp primitives based on the touch heatmap. For example, the shape of a touch region in the touch heatmap (where the object is to be grasped) can be analyzed by the at least one processor, and a suitable grasp primitive (the first grasp primitive) can be selected which is appropriate to grasp the analyzed shape.

FIG. 19 is a side view of an end effector 1910 (in this case, a human hand) touching a pencil 2000 (an object). Detailed features of pencil 2000 are discussed later with reference to FIGS. 20A and 20B. The situation illustrated in FIG. 19 can be captured as image data and used (at least in part) to generate a touch heatmap as discussed earlier with reference to method 600 in FIG. 6. In particular, end effector 1910 as shown in FIG. 19 includes a thumb 1930 and an index finger 1940 (other digits can also be included, but are not shown to reduce clutter). Pencil 2000 is gripped between thumb 1930 and index finger 1940, such that thumb 1930 touches pencil 2000 at region 1932, and index finger 1940 touches pencil 2000 at region 1942. Further, pencil 2000 also touches end effector 1910 at region 1935 which spans between thumb 1930 and index finger 1940.

FIGS. 20A and 20B are side views of pencil 2000 (or a corresponding object model thereof). FIG. 20A is a side view of pencil 2000, showing the same side visible in FIG. 19. FIG. 20B is a side view of pencil 2000, showing an opposing side view to FIGS. 19 and 20A (that is, FIG. 20A shows a side of pencil 2000 not visible in FIGS. 19 and 20A). Pencil 2000 is shown as including a shaft 2002, a pointed end 2004, a writing tip (lead) 2006, an eraser 2008, and a band 2010 which couples eraser 2008 to shaft 2002.

FIGS. 20A and 20B show touch region 2032, corresponding to region 1932 in FIG. 19 where thumb 1930 touches pencil 2000. FIGS. 20A and 20B also show touch region 2042 where index finger 1940 touches pencil 2000. FIGS. 20A and 20B also show touch region 2035 where end effector 1910 touches pencil 2000 at region 1935.

FIGS. 20A and 20B illustrate touch regions of pencil 2000, for a single scenario where pencil 2000 is touched by end effector 1910. However, as discussed earlier with reference to FIGS. 8A, 8B, 9A, 9B, 10, 11, 12, 13, 14, 15, and 16, when generating a touch heatmap, a plurality of images of an object can be utilized, featuring a plurality of touches of the object. In this regard, FIG. 21 is a side view of pencil 2000 (or object model thereof), and an associated touch heatmap generated based on a plurality of touches of pencil 2000. In FIG. 21, a touch region 2110 is illustrated, corresponding to touches of pencil 2000 between a thumb and forefinger of an end effector, in a plurality of situations. Because pencil 2000 can be rotated readily about its longitudinal axis when grasped in the manner shown in FIG. 19, touch region 2110 is illustrated as a band which wraps around pencil 2000 (because the location where index finger 1940 and thumb 1930 will touch pencil 2000 will vary for each grasp of the pencil, as the pencil is generally symmetrical about is longitudinal axis). FIG. 21 also illustrates touch region 2120, corresponding to touches of pencil 2000 against regions akin to region 1935 of at least one end effector, in a plurality of situations. Similarly to as discussed above, because pencil 2000 can be rotated readily about its longitudinal axis when grasped in the manner shown in FIG. 19, touch region 2120 is illustrated as a band which wraps around pencil 2000. FIG. 21 also shows a touch region 2130, corresponding to touches of pencil by an end effector in a different configuration than that shown in FIG. 19. In particular, wrapping fingers of a hand around shaft 2002 of pencil 2000 to form a first will result in the end effector touching pencil 2000 at touch region 2130. However, in the illustrated example this is a less common way to grasp a pencil, and touch region 2130 is illustrated with lighter shading than touch regions 2110 and 2120, indicative of frequency of touch at the corresponding regions.

In some implementations, where the touch heatmap is indicative of a plurality of touch regions of an object model, method 1800 can further comprise selecting a subset of touch regions from the plurality of touch regions. In such implementations, controlling the at least one end effector as in 1810 comprises controlling the at least one end effector to grasp the object based on the subset of touch regions. An illustrative example is shown in FIG. 22 discussed below.

Figure 22:
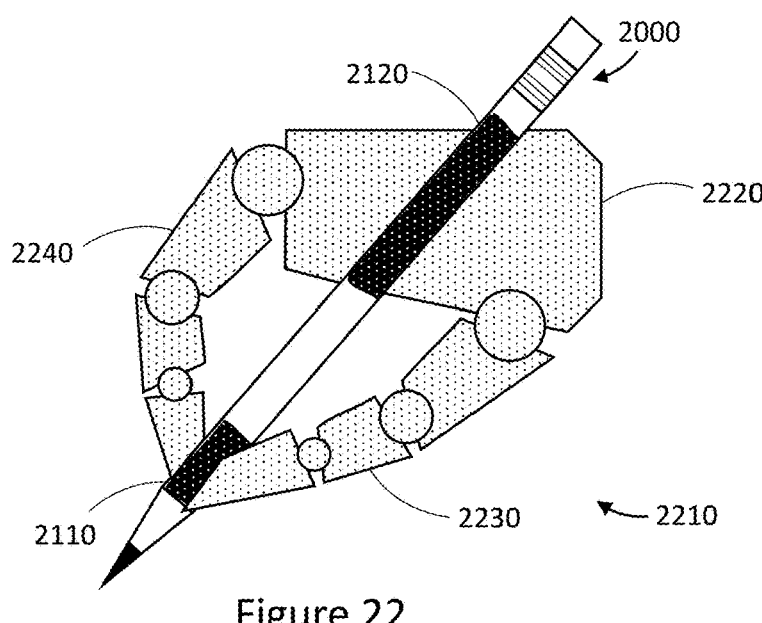
FIG. 22 is a side view of the shown in FIGS. 19, 20A, and 20B pencil being grasped by a robotic end effector, in accordance with at least one illustrated example.

FIG. 22 is a side view of a robotic end effector 2210 touching pencil 2000 (an object). Detailed features of pencil 2000 are discussed earlier with reference to FIGS. 20A, 20B, and 21. In FIG. 22, end effector 2210 includes a palm-shaped member 2220, a thumb-shaped member 2230, and a finger-shaped member 2240 (other members can also be included, but are not shown to reduce clutter). To grasp pencil 2000 in a writing grip as shown, a robot controller which controls end effector 2210 (and which executes method 1800) selects touch regions 2110 and 2120, and does not select touch region 2130, as shown in FIG. 21. At 1810, controlling the end effector 2210 comprises controlling end effector 2210 to touch pencil 2000 at touch regions 2110 and 2120. In this way, pencil 2000 is gripped between thumb-shaped member 2230 and finger-shaped member 2240, such that thumb-shaped member 2230 and finger-shaped member 2240 touch pencil 2000 at touch region 2110, and such that touch region 2120 of pencil 2000 touches palm-shaped member 2220.

Selection of a subset of touch regions can be performed in a number of different ways. In an exemplary implementation, a work objective of the robot system can be accessed (e.g. retrieved from at least one non-transitory processor-readable storage medium of the robot system, or received at a communication interface of the robot system). The robot controller of the robot system can then select the subset of touch regions based on the work objective of the robot system.

For example, if a work objective of the robot system is to performing a writing or drawing task, such as with pencil 2000 discussed with reference to FIGS. 20A, 20B, 21, and 22, the robot controller can select touch regions 2110 and 2120 as the subset of touch regions, to control an end effector to grasp pencil 2000 in a writing configuration, as shown in FIG. 22. On the other hand, if the work objective of the robot system is to pick up pencil 2000 and put it in a container, the robot controller can instead select touch region 2130, and control the end effector to grasp pencil 2000 with a first or closed configuration (such as that shown in FIGS. 4B and 4C).

As another example, if a work objective of the robot system is to use a knife (such as knife 700 discussed with reference to FIGS. 7, 8A, 8B, 10, 11, 12, and 17) to cut vegetables, the robot controller can select any of touch regions 1602, 1604, 1606, 1608, and 1610 as shown in FIG. 16 as the subset of touch regions, and control the end effector to grasp knife 700 in accordance with these touch regions. In this way, the robot system will grasp knife 700 by the handle 702, similar to as shown in FIG. 8A, 8B, 10, or 11, which is optimal for using knife 700 for cutting. On the other hand, if a work objective of the robot system is to pick up a knife (such as knife 700 discussed with reference to FIGS. 7, 8A, 8B, 10, 11, 12, and 17) and pass the knife to another party, the robot system can select touch region 1612 as shown in FIG. 16 (and any other appropriate touch region on the reverse side of the knife not visible in FIG. 16), and control the end effector to grasp knife 700 in accordance with this subset of at least one touch region. In this way, the robot system will grasp knife 700 by blade 704, similar to as shown in FIG. 12, so that handle 702 of knife 700 can be safely presented to a receiving party.

In some implementations, selecting the subset of touch regions comprises selecting the subset of touch regions based on proximity of the subset of touch regions at the object to the robot body or the at least one end effector. An illustrative example is shown in FIGS. 23A and 23B discussed below.

Figure 23A:
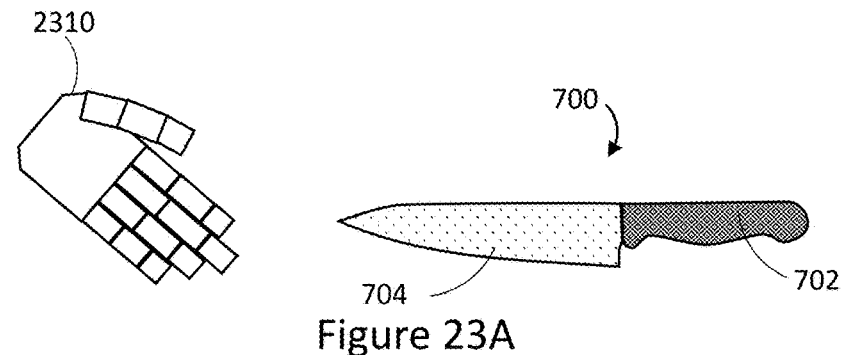
FIGS. 23A and 23B are side views of a knife being reached for by an end effector, in accordance with at least two illustrated examples.
Figure 23B:
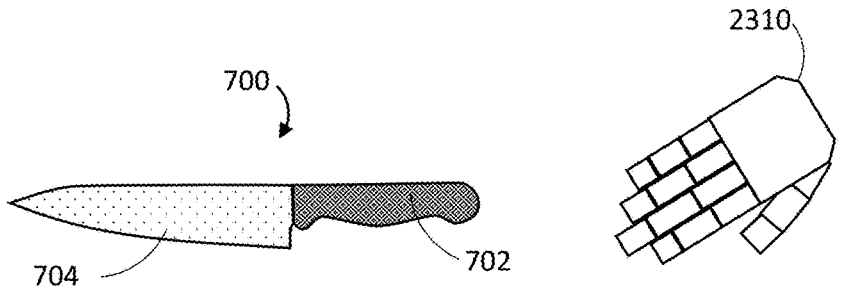

FIGS. 23A and 23B are side views of knife 700 as discussed earlier with reference to FIG. 7, and an end effector 2310 poised to touch or grasp knife 700. In FIG. 23A, end effector 2310 is closer (more proximate to) blade 704 than to handle 702. Consequently, in selecting a subset of touch regions at which to touch knife 700, the robot control which controls end effector 2310 selects touch regions at blade 704 (such as touch region 1612 shown in FIG. 16). In FIG. 23B, end effector 2310 is closer (more proximate to) handle 702 than blade 704. Consequently, in selecting a subset of touch regions at which to touch knife 700, the robot control which controls end effector 2310 selects touch regions at handle 702 (such as touch regions 1602, 1604, 1606, 1608, and/or 1610 shown in FIG. 16).

In some implementations, selecting the subset of touch regions comprises selecting the subset of touch regions based on frequency of touch as indicated in the touch heatmap. As an example, with reference to FIG. 16, a robot controller can select touch regions 1602, 1604, and 1606 as the subset of touch regions, and exclude other regions such as 1608, 1610, 1612, and the remainder of knife 700 because these regions are less frequently touched. Exactly what frequency of touch is appropriate for inclusion in the subset of touch regions can be selected as appropriate for a given application, and the indicated subset of regions is merely exemplary.

In some implementations, where the robot controller accesses a library of grasp primitives, selecting the subset of touch regions comprises selecting the subset of touch regions based on the subset of touch regions being graspable in accordance with at least one grasp primitive in the library of grasp primitives. As an example, with reference to FIGS. 21 and 22, a robot controller can access a library of grasp primitives including a writing utensil grasp primitive, such as the grasp configuration of end effector 2210 shown in FIG. 22. Consequently, the robot controller can select the subset of touch regions to include touch regions 2110 and 2120 of pencil 2000, which are suitable for grasping by such a writing utensil grasp primitive. As another example, if the library of grasp primitives does not include the writing utensil grasp primitive, but does include a closed or first grasp primitive, such as shown in FIGS. 4B and 4C, the robot controller can instead select the subset of touch regions as including touch region 2130 shown in FIG. 21, which is suitable for grasping by such a closed or first grasp primitive. Whether a particular grasp primitive is "suitable" for grasping an object in accordance with a particular subset of touch regions can be determined in a variety of ways. In one example, the touch heatmap can indicate not only touch regions, but also grasp primitives suitable for grasping the object at particular touch regions. If a particular grasp primitive is indicated in the touch heatmap, and is also available in the library of grasp primitives, this particular grasp primitive can be selected to grasp the object. In another example, the robot controller can simulate grasping of the object at touch regions thereof, in accordance with available grasp primitives in the library of grasp primitives, to determine an appropriate grasp primitive and subset of touch regions suitable for grasping by said grasp primitive.

In some implementations, where the robot controller accesses a library of grasp primitives, the robot controller selects a grasp primitive based on the subset of touch regions being graspable in accordance with the grasp primitive. As an example, with reference to FIGS. 21 and 22, a robot controller can select the subset of touch regions to include touch regions 2110 and 2120 of pencil 2000, and subsequently the robot controller can select a writing utensil grasp primitive from the library of grasp primitives which is suitable to grasp pencil 2000 at touch regions 2110 and 2120. Compared to the discussion in the preceding paragraph, the order of selection is opposite. In this regard, it is within the scope of the present disclosure that grasp primitive can be selected based on subset of touch regions, and that touch regions can be selected based on grasp primitive.

A number of techniques and means for selecting subsets of touch regions, and for selecting grasp primitives, are discussed above (e.g. with reference to FIG. 18 and onward). As appropriate for a given application, multiple techniques for selection can be combined. As one example, a touch region can be selected based on proximity to an end effector and based on work objective (e.g. the closest touch region to the end effector which is suitable for a work objective can be selected). As another example, a touch region can be selected based on work objective and available grasp primitives (e.g. a work-objective suitable touch region, for which a corresponding grasp primitive is available, can be selected).

Figure 24:
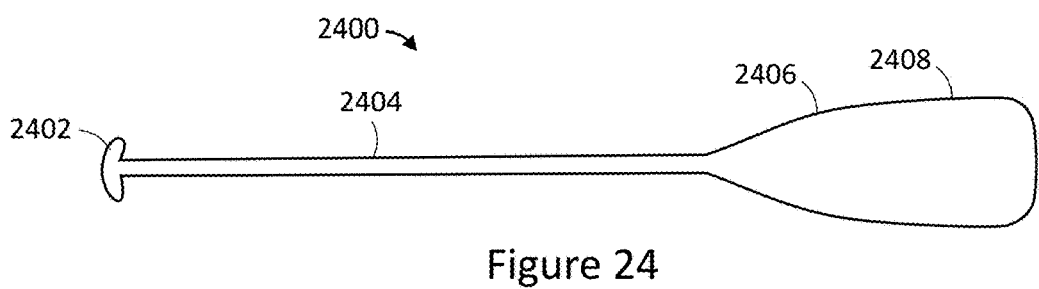
FIG. 24 is a front view of a paddle 2400.

In some implementations, a robot body comprises more than one end effector, and some objects are well suited to being grasped by more than one end effector. In this regard, FIG. 24 is a front view of paddle 2400 (e.g. such as those used for paddling a canoe or other watercraft). Paddle 2400 is shown as including at least a grip 2402 (an area intended for grasping), a blade 2408 (a portion intended for asserting in water), a shaft 2404 adjacent grip 2402, and a shoulder 2406 which extends between and connects shaft 2404 with blade 2408. In some cases, shoulder 2406 can be considered as being part of blade 2408. Paddle 2400 is an example of an object for which a touch heatmap can be generated (in accordance with method 600), and which can be grasped (in accordance with method 1800).

Figure 25:
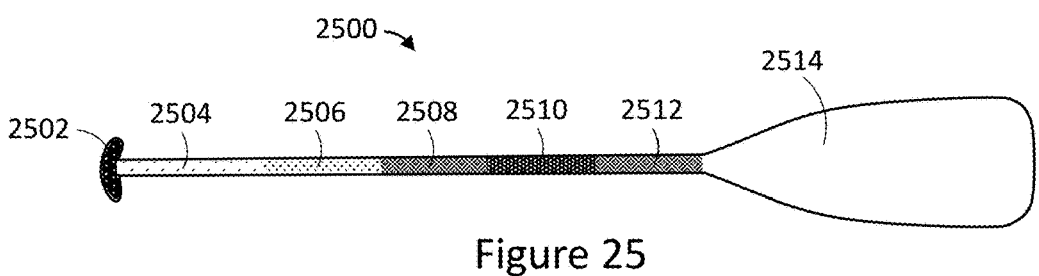
FIG. 25 is a front view of an object model and touch heatmap for the paddle shown in FIG. 24, in accordance with one illustrated example.

FIG. 25 is a front view of an exemplary object model 2500 representing paddle 2400 in FIG. 24. A touch heatmap is also shown in FIG. 25, including touch regions 2502, 2504, 2506, 2508, 2510, and 2512. Region 2514 is also shown, but minimal touch occurs in this region during generation of the touch heatmap, and so region 2514 in this example is not classified as a touch region. In other examples however, 2514 could be touched to some extent, such that region 2514 could be classified as a touch region. Touch regions 2502, 2504, 2506, 2508, 2510, and 2512 are illustrated in different shades, with darker shades indicating relatively higher frequency of touch during generation of the touch heatmap, and lighter shades indicating relatively lower frequency of touch during generation of the touch heatmap. In this regard, touch region 2502 is the most frequently touched region, followed by touch region 2510, followed by touch regions 2508 and 2512, followed by touch region 2506, followed by touch region 2504.

Figure 26:
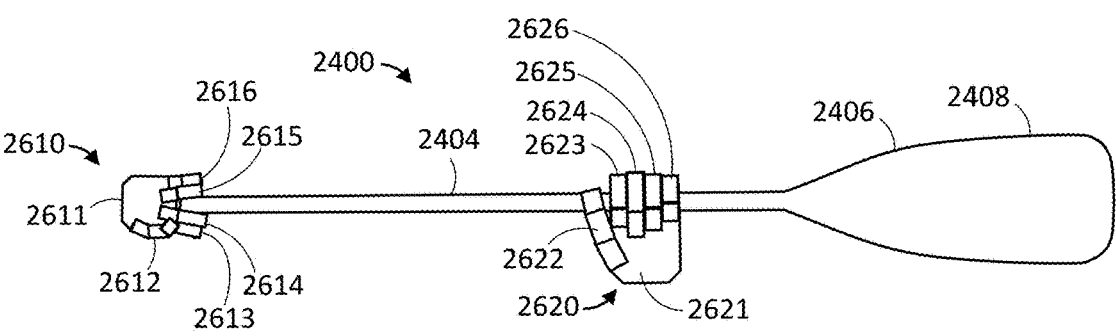
FIG. 26 is a front view of the paddle shown in FIG. 24 being grasped by two end effectors, in accordance with at least one illustrated example.

In an implementation where a robot body includes a first end effector and a second end effector (such as illustrated in FIG. 1), the robot controller can control the robot body to grasp an object with both the first and the second end effector. To this end, method 1800 can further including selecting, by the robot controller, a first subset of touch regions and a second subset of touched regions from a plurality of touch regions. For example, in the scenario of FIG. 25, the robot controller can select the first subset of touch regions as including touch region 2502 (the most frequently touched region), and can select the second subset of touch regions as including touch region 2510 (the second most touched region). Other metrics for selecting touch regions can be utilized, such as those discussed earlier, as appropriate for a given application. Controlling the at least one end effector at 1810 can comprise controlling the first end effector to grasp the object in accordance with the first subset of touch regions, and controlling the second end effector to grasp the object in accordance with the second subset of touch regions. This is shown in FIG. 26, which is a front view of paddle 2400 discussed with reference to FIG. 24, grasped by a first end effector 2610 and a second end effector 2620. First end effector 2610 has a palm-shaped member 2611, with thumb-shaped member 2612 and finger-shaped members 2613, 2614, 2615, and 2616 extending therefrom. Finger-shaped members 2613, 2614, 2615, and 2616 are shown wrapped around grip 2402, thereby grasping grip 2402 (which corresponds to touch region 2502 in FIG. 25). Second end effector 2620 has a palm-shaped member 2621, with thumb-shaped member 2622 and finger-shaped members 2623, 2624, 2625, and 2626 extending therefrom. Finger-shaped members 2623, 2624, 2625, and 2626 are shown wrapped around shaft 2404, thereby grasping shaft 2404 at a region corresponding to touch region 2510 in FIG. 25.

Various exemplary methods of operation of a robot system are described herein, including at least method 1800 in FIG. 18 (and in some implementations method 600 in FIG. 6). As discussed earlier, a method of operation of a robot system is a method in which at least some, if not all, of the various acts are performed by the robot system. For example, certain acts of a method of operation of a robot body may be performed by at least one processor or processing unit (hereafter "processor") of the robot body communicatively coupled to a non-transitory processor-readable storage medium of the robot body and, in some implementations, certain acts of a method of operation of a robot system may be performed by peripheral components of the robot body that are communicatively coupled to the at least one processor, such as one or more physically actuatable components (e.g., arms, legs, end effectors, grippers, hands), one or more sensors (e.g., optical sensors, audio sensors, tactile sensors, haptic sensors), mobility systems (e.g., wheels, legs), communications and networking hardware (e.g., receivers, transmitters, transceivers), and so on. The non-transitory processor-readable storage medium of the robot body may store data (including, e.g., at least one library of reusable work primitives, grasp primitives, three-dimensional geometric shapes, platonic representations) and/or processor-executable instructions that, when executed by the at least one processor, cause the robot body to perform the method and/or cause the at least one processor to perform those acts of the method that are performed by the at least one processor. The robot body may communicate, via communications and networking hardware communicatively coupled to the robot's at least one processor, with remote systems and/or remote non-transitory processor-readable storage media. Thus, unless the specific context requires otherwise, references to a robot system's non-transitory processor-readable storage medium, as well as data and/or processor-executable instructions stored in a non-transitory processor-readable storage medium, are not intended to be limiting as to the physical location of the non-transitory processor-readable storage medium in relation to the at least one processor of the robot and the rest of the robot hardware. In other words, a robot system's non-transitory processor-readable storage medium may include non-transitory processor-readable storage media located on-board the robot body (such as non-transitory processor-readable storage media 132, 232, or 304) and/or non-transitory processor-readable storage media located remotely from the robot body (such as non-transitory processor-readable storage medium 354), unless the specific context requires otherwise. Further, a method of operation of a robot system such as method 1800 (and in some cases method 600) can be implemented as a computer program product or robot control module. Such a computer program product or robot control module comprises processor-executable instructions or data that, when the computer program product or robot control module is stored on a non-transitory processor-readable storage medium of the robot system, and the computer program product or robot control module is executed by at least one processor of the robot, the computer program product or robot control module (or the processor-executable instructions or data thereof) cause the robot system to perform acts of the method.

In some implementations, each of the acts of any of the methods discussed herein (e.g. method 1800) are performed by hardware of the robot body, such that the entire method is performed locally at the robot body. In such implementations, the robot carries the at least one sensor and the robot controller, and accessed data (such as object models, touch heatmaps, and/or grasp primitives) can be accessed from a non-transitory processor-readable storage medium at the robot body (e.g. a non-transitory processor-readable storage medium of a robot controller local to the robot body such as non-transitory processor-readable storage media 132, 232, or 304). Alternatively, accessed data (such as object models, touch heatmaps, and/or grasp primitives) can be accessed from a non-transitory processor-readable storage medium remote from the robot (e.g., a remote device can send the data, which is received by a communication interface of the robot body).

In other implementations, the robot system includes a remote device (such as remote device 350 in FIG. 3, or a remote processing server), which is communicatively coupled to the robot body by at least one communication interface. In such implementations, acts of capturing sensor data can be performed by at least one sensor positioned at the robot body, and this sensor data can be transmitted to the remote device via the at least one communication interface. In such implementations, acts of accessing an object model (e.g. act 1804), accessing a touch heatmap (e.g. act 1806), accessing a grasp primitive (e.g. act 1808), and controlling the end effector (e.g. act 1810) can be performed by a robot controller (at least one processor and at least one non-transitory processor-readable storage medium) located at the remote device. Controlling the end effector by a robot controller at a remote device can comprise the robot controller preparing and sending control instructions to the robot body via a communication interface.

In yet other implementations, the robot system includes a remote device (such as remote device 350 in FIG. 3, or a remote processing server), which is communicatively coupled to the robot body by at least one communication interface. In such implementations, acts of capturing sensor data can be performed by at least one sensor positioned at the robot body, and this sensor data can be transmitted to the remote device via the at least one communication interface. Further, the robot controller can be spread between the robot body and the remote device. For example, the at least one processor of the robot controller can comprise a first processor positioned at the robot body and a second processor positioned at the remote device. Similarly, the at least one non-transitory processor-readable storage medium of the robot controller can comprise a first non-transitory processor-readable storage medium positioned at the robot body and a second non-transitory processor-readable storage medium positioned at the remote device. The first non-transitory processor-readable storage medium stores first processor-executable instructions which when executed by the first processor cause components at the robot body to perform acts of the methods described herein. Similarly, the second non-transitory processor-readable storage medium stores second processor-executable instructions which when executed by the second processor cause components at the remote device to perform acts of the methods described herein. In one example, acts of capturing sensor data (e.g. act 1802) and controlling the end effector (e.g. act 1810) can be performed at the robot body, with captured sensor data being transmitted to the remote device via a communication interface. Further in this example, acts of accessing an object model (e.g. act 1804 of method 1800), accessing a touch heatmap (e.g. act 1806), and accessing a grasp primitive (e.g. act 1808) can be performed at the remote device, with data indicating the object model, the touch heatmap, and/or the grasp primitive being transmitted to the robot body via a communication interface.

Several examples of where particular acts can be performed are discussed above. However, these examples are merely illustrative, and any appropriate arrangement for performing certain acts at the robot body or at a remote device can be utilized, as appropriate for a given application.

The robot systems described herein may, in some implementations, employ any of the teachings of U.S. patent application Ser. No. 16/940,566 (Publication No. US 2021-0031383 A1), U.S. patent application Ser. No. 17/023,929 (Publication No. US 2021-0090201 A1), U.S. patent application Ser. No. 17/061,187 (Publication No. US 2021-0122035 A1), U.S. patent application Ser. No. 17/098,716 (Publication No. US 2021-0146553 A1), U.S. patent application Ser. No. 17/111,789 (Publication No. US 2021-0170607 A1), U.S. patent application Ser. No. 17/158,244 (Publication No. US 2021-0234997 A1), US Patent Publication No. US 2021-0307170 A1, and/or U.S. patent application Ser. No. 17/386,877, as well as U.S. Provisional Patent Application Ser. No. 63/151,044, U.S. patent application Ser. No. 17/719,110, U.S. patent application Ser. No. 17/737,072, U.S. patent application Ser. No. 17/846,243, U.S. patent application Ser. No. 17/566,589, U.S. patent application Ser. No. 17/962,365, U.S. patent application Ser. No. 18/089,155, U.S. patent application Ser. No. 18/089,517, U.S. patent application Ser. No. 17/985,215, U.S. patent application Ser. No. 17/883,737, U.S. Provisional Patent Application Ser. No. 63/441,897, and/or U.S. patent application Ser. No. 18/117,205, each of which is incorporated herein by reference in its entirety.

Throughout this specification and the appended claims the term "communicative" as in "communicative coupling" and in variants such as "communicatively coupled," is generally used to refer to any engineered arrangement for transferring and/or exchanging information. For example, a communicative coupling may be achieved through a variety of different media and/or forms of communicative pathways, including without limitation: electrically conductive pathways (e.g., electrically conductive wires, electrically conductive traces), magnetic pathways (e.g., magnetic media), wireless signal transfer (e.g., radio frequency antennae), and/or optical pathways (e.g., optical fiber). Exemplary communicative couplings include, but are not limited to: electrical couplings, magnetic couplings, radio frequency couplings, and/or optical couplings.

Throughout this specification and the appended claims, infinitive verb forms are often used. Examples include, without limitation: "to encode," "to provide," "to store," and the like. Unless the specific context requires otherwise, such infinitive verb forms are used in an open, inclusive sense, that is as "to, at least, encode," "to, at least, provide," "to, at least, store," and so on.

This specification, including the drawings and the abstract, is not intended to be an exhaustive or limiting description of all implementations and embodiments of the present robots, robot systems and methods. A person of skill in the art will appreciate that the various descriptions and drawings provided may be modified without departing from the spirit and scope of the disclosure. In particular, the teachings herein are not intended to be limited by or to the illustrative examples of computer systems and computing environments provided.

This specification provides various implementations and embodiments in the form of block diagrams, schematics, flowcharts, and examples. A person skilled in the art will understand that any function and/or operation within such block diagrams, schematics, flowcharts, or examples can be implemented, individually and/or collectively, by a wide range of hardware, software, and/or firmware. For example, the various embodiments disclosed herein, in whole or in part, can be equivalently implemented in one or more: application-specific integrated circuit(s) (i.e., ASICs); standard integrated circuit(s); computer program(s) executed by any number of computers (e.g., program(s) running on any number of computer systems); program(s) executed by any number of controllers (e.g., microcontrollers); and/or program(s) executed by any number of processors (e.g., microprocessors, central processing units, graphical processing units), as well as in firmware, and in any combination of the foregoing.

Throughout this specification and the appended claims, a "memory" or "storage medium" is a processor-readable medium that is an electronic, magnetic, optical, electromagnetic, infrared, semiconductor, or other physical device or means that contains or stores processor data, data objects, logic, instructions, and/or programs. When data, data objects, logic, instructions, and/or programs are implemented as software and stored in a memory or storage medium, such can be stored in any suitable processor-readable medium for use by any suitable processor-related instruction execution system, apparatus, or device, such as a computer-based system, processor-containing system, or other system that can fetch the data, data objects, logic, instructions, and/or programs from the memory or storage medium and perform various acts or manipulations (i.e., processing steps) thereon and/or in response thereto. Thus, a "non-transitory processor-readable storage medium" can be any element that stores the data, data objects, logic, instructions, and/or programs for use by or in connection with the instruction execution system, apparatus, and/or device. As specific non-limiting examples, the processor-readable medium can be: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and/or any other non-transitory medium.

The claims of the disclosure are below. This disclosure is intended to support, enable, and illustrate the claims but is not intended to limit the scope of the claims to any specific implementations or embodiments. In general, the claims should be construed to include all possible implementations and embodiments along with the full scope of equivalents to which such claims are entitled.

The invention claimed is:

1. A robot system comprising:
   a robot body having at least one end effector;
   at least one sensor;
   a robot controller including at least one processor and at least one non-transitory processor-readable storage medium storing processor-executable instructions which, when executed by the at least one processor, cause the robot system to:
   capture, by the at least one sensor, sensor data including a representation of an object;
   access, in a library of object models, an object model representation of the object based on the sensor data;
   access a touch heatmap associated with the object model, the touch heatmap indictive of a plurality of touch regions of the object model;
   access a work of the robot system;
   select a subse uch regions from the plurality of touch regions based at least in part on the work objective of the robot system; and
   control, by the robot controller, the at least one end effector to grasp the object based at least in part on the subset of touch regions of the object model.

2. The robot system of claim 1, wherein:
   the at least one non-transitory processor-readable storage medium further stores a library of grasp primitives;
   the processor-executable instructions further cause the at least one processor to access a first grasp primitive from the library of grasp primitives; and
   the processor-executable instructions which cause the robot controller to control the at least one end effector to grasp the object further cause the robot controller to control the at least one end effector to grasp the object in accordance with the first grasp primitive.

3. The robot system of claim 2, wherein the touch heatmap is further indicative of at least one grasp primitive including the first grasp primitive for grasping the object model at the at least one touch region.

4. The robot system of claim 2, wherein the processor-executable instructions further cause the robot controller to select the first grasp primitive from the library of grasp primitives based at least in part on the touch heatmap.

5. The robot system of claim 1, wherein the processor-executable instructions which cause the robot controller to select the subset of touch regions cause the robot controller to select the subset of touch regions based at least in part on proximity of the subset of touch regions at the object to the robot body or to the at least one end effector.

6. The robot system of claim 1, wherein:

the at least one non-transitory processor-readable storage medium further stores a library of grasp primitives usable by the at least one end effector; and the processor-executable instructions which cause the robot controller to select the subset of touch regions cause the robot controller to select the subset of touch regions based at least in part on the subset of touch regions being graspable in accordance with at least one grasp primitive in the library of grasp primitives.

7. The robot system of claim 1, wherein:

the at least one non-transitory processor-readable storage medium further stores a library of grasp primitives usable by the at least one end effector;

the processor-executable instructions further cause the robot controller to select a first grasp primitive of the library of grasp primitives capable of grasping the object in accordance with the subset of touch regions; and the processor-executable instructions which cause the robot controller to control the at least one end effector to grasp the object based at least in part on the subset of touch regions further cause the robot controller to grasp the object in accordance with the first grasp primitive.

8. The robot system of claim 1, wherein:

the at least one end effector includes a first end effector and a second end effector;

the processor-executable instructions that cause the robot controller to select a subset of touch regions from the plurality of touch regions, further cause the robot controller to select a first subset of touch regions and a second subset of touch regions from the plurality of touch regions; and the processor-executable instructions which cause the robot controller to control the at least one end effector to grasp the object cause the robot controller to control the first end effector to grasp the object in accordance with the first subset of touch regions and to control the second end effector to grasp the object in accordance with the second subset of touch regions.

9. The robot system of claim 1, wherein the touch heatmap is stored as metadata associated with the object model.

10. A robot system comprising:

a robot body having at least one end effector;

at least one sensor;

a robot controller including at least one processor and at least one non-transitory processor-readable storage medium storing processor-executable instructions which, when executed by the at least one processor, cause the robot system to:

capture, by the at least one sensor, sensor data including a representation of an object;

access, in a library of object models, an object model representation of the object based on the sensor data;

access a touch heatmap associated with the object model, the touch heatmap indictive of a plurality of touch regions of the object model and the touch heatmap indicative of frequency of touch at each touch region in the plurality of touch regions;

select a subset of touch regions from the plurality of touch regions based at least in part on frequency of touch as indicated in the touch heatmap; and control, by the robot controller, the at least one end effector to grasp the object based at least in part on the subset of touch regions of the object model.

11. The robot system of claim 10, wherein:

the at least one non-transitory processor-readable storage medium further stores a library of grasp primitives;

the processor-executable instructions further cause the at least one processor to access a first grasp primitive from the library of grasp primitives; and the processor-executable instructions which cause the robot controller to control the at least one end effector to grasp the object further cause the robot controller to control the at least one end effector to grasp the object in accordance with the first grasp primitive.

12. The robot system of claim 11, wherein the touch heatmap is further indicative of at least one grasp primitive including the first grasp primitive for grasping the object model at the at least one touch region.

13. The robot system of claim 11, wherein the processor-executable instructions further cause the robot controller to select the first grasp primitive from the library of grasp primitives based at least in part on the touch heatmap.

14. The robot system of claim 10, wherein the processor-executable instructions which cause the robot controller to select the subset of touch regions cause the robot controller to select the subset of touch regions based at least in part on proximity of the subset of touch regions at the object to the robot body or to the at least one end effector.

15. The robot system of claim 10, wherein:

the at least one non-transitory processor-readable storage medium further stores a library of grasp primitives usable by the at least one end effector; and the processor-executable instructions which cause the robot controller to select the subset of touch regions cause the robot controller to select the subset of touch regions based at least in part on the subset of touch regions being graspable in accordance with at least one grasp primitive in the library of grasp primitives.

16. The robot system of claim 10, wherein:

the at least one non-transitory processor-readable storage medium further stores a library of grasp primitives usable by the at least one end effector;

the processor-executable instructions further cause the robot controller to select a first grasp primitive of the library of grasp primitives capable of grasping the object in accordance with the subset of touch regions; and the processor-executable instructions which cause the robot controller to control the at least one end effector to grasp the object based at least in part on the subset of touch regions further cause the robot controller to grasp the object in accordance with the first grasp primitive.

17. The robot system of claim 10, wherein:

the at least one end effector includes a first end effector and a second end effector;

the processor-executable instructions that cause the robot controller to select a subset of touch regions from the plurality of touch regions, further cause the robot controller to select a first subset of touch regions and a second subset of touch regions from the plurality of touch regions; and the processor-executable instructions which cause the robot controller to control the at least one end effector to grasp the object cause the robot controller to control the first end effector to grasp the object in accordance with the first subset of touch regions and to control the second end effector to grasp the object in accordance with the second subset of touch regions.

18. The robot system of claim 10, wherein the touch heatmap is stored as metadata associated with the object model.

\* \* \* \* \*